US009175124B2

(12) United States Patent
Chaboche et al.

(10) Patent No.: US 9,175,124 B2
(45) Date of Patent: Nov. 3, 2015

(54) ELASTOMER MIXTURE MAINLY COMPRISING A DIENE ELASTOMER COUPLED BY AN AMINOALKOXYSILANE GROUP, RUBBER COMPOSITION INCLUDING THE SAME AND METHODS FOR OBTAINING SAME

(75) Inventors: Philippe Chaboche, Clermont-Ferrand (FR); Jean-Michel Favrot, Cournon d'Auvergne (FR); Nicolas Seeboth, Clermont-Ferrand (FR); Fanny Barbotin, Jarrie (FR); Stéphanie De Landtsheer, Moscou (RU)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 1227 days.

(21) Appl. No.: 12/990,212

(22) PCT Filed: Apr. 27, 2009

(86) PCT No.: PCT/EP2009/055061
§ 371 (c)(1),
(2), (4) Date: Feb. 28, 2011

(87) PCT Pub. No.: WO2009/133068
PCT Pub. Date: Nov. 5, 2009

(65) Prior Publication Data
US 2011/0178233 A1    Jul. 21, 2011

(30) Foreign Application Priority Data

Apr. 29, 2008   (FR) ...................... 08 52868

(51) Int. Cl.
| | |
|---|---|
| *C08F 8/00* | (2006.01) |
| *C08F 297/04* | (2006.01) |
| *C08C 19/25* | (2006.01) |
| *C08C 19/22* | (2006.01) |
| *C08F 8/32* | (2006.01) |
| *B60C 1/00* | (2006.01) |
| *C08C 19/44* | (2006.01) |
| *C08F 8/42* | (2006.01) |
| *C08L 15/00* | (2006.01) |
| *C08L 53/02* | (2006.01) |

(52) U.S. Cl.
CPC .............. *C08F 297/04* (2013.01); *B60C 1/0016* (2013.01); *C08C 19/22* (2013.01); *C08C 19/25* (2013.01); *C08C 19/44* (2013.01); *C08F 8/32* (2013.01); *C08F 8/42* (2013.01); *C08F 297/044* (2013.01); *C08L 15/00* (2013.01); *C08L 53/025* (2013.01)

(58) Field of Classification Search
CPC .......... C08C 19/22; C08C 19/25; C08C 8/32; C08L 15/00; B60C 1/0016

USPC .......................................... 525/100, 101, 102
See application file for complete search history.

(56) References Cited

U.S. PATENT DOCUMENTS

| | | | |
|---|---|---|---|
| 5,015,692 A | 5/1991 | Takao et al. | |
| 5,066,721 A | 11/1991 | Hamada et al. | |
| 5,508,333 A * | 4/1996 | Shimizu ........................ | 524/424 |
| 5,811,479 A | 9/1998 | Labauze | |
| 6,774,255 B1 | 8/2004 | Tardivat et al. | |
| 8,022,129 B2 * | 9/2011 | Tadaki et al. ................. | 524/492 |
| 2004/0051210 A1 | 3/2004 | Tardivat et al. | |
| 2004/0132880 A1 | 7/2004 | Durel et al. | |
| 2004/0254301 A1 | 12/2004 | Tsukimawashi et al. | |
| 2004/0260002 A1 | 12/2004 | Robert et al. | |
| 2005/0016650 A1 | 1/2005 | Durel et al. | |
| 2005/0016651 A1 | 1/2005 | Durel et al. | |
| 2005/0203251 A1 | 9/2005 | Oshima et al. | |
| 2010/0000639 A1* | 1/2010 | Randall et al. ............. | 152/209.1 |

FOREIGN PATENT DOCUMENTS

| | | |
|---|---|---|
| EP | 0 299 074 A1 | 1/1989 |
| EP | 0 341 496 A2 | 11/1989 |
| EP | 0 590 491 A2 | 4/1994 |
| EP | 0 593 049 A1 | 4/1994 |
| EP | 0 992 537 A1 | 4/2000 |
| EP | 1 113 024 A1 | 7/2001 |
| EP | 1 457 501 A | 9/2004 |
| FR | 2 744 127 A | 8/1997 |
| JP | 2001-131230 | 5/2001 |
| JP | 2001-131340 | 5/2001 |
| JP | 2001-131343 | 5/2001 |

(Continued)

OTHER PUBLICATIONS

International Search Report dated Jun. 17, 2010 for International Application No. PCT/EP2009/055061.

*Primary Examiner* — Peter D Mulcahy
(74) *Attorney, Agent, or Firm* — Dickinson Wright PLLC

(57) ABSTRACT

The present invention relates to an elastomer mixture resulting from the modification of a diene elastomer by a coupling agent that introduces, into the elastomer chain, an alkoxysilane group bearing a tertiary or secondary amine functional group. This mixture predominantly comprises the diene elastomer coupled by the alkoxysilane group bearing a tertiary or secondary amine functional group which is bonded to the diene elastomer through the silicon atom. The invention also relates to a reinforced rubber composition, in particular that can be used for the manufacture of tires, which comprises a reinforcing filler and an elastomer matrix comprising at least this elastomer mixture, and to its preparation process. This composition has improved hysteresis and mechanical properties in the vulcanized state, and also improved processing in the uncured state.

22 Claims, No Drawings

(56) References Cited

FOREIGN PATENT DOCUMENTS

| JP | 2001-131344 | 5/2001 |
|----|-------------|--------|
| JP | 2001-131345 | 5/2001 |
| JP | 2001-158834 | 6/2001 |
| JP | 2001-158835 | 6/2001 |
| JP | 2001-158836 | 6/2001 |
| JP | 2001-158837 | 6/2001 |
| JP | 2005-171034 | 6/2005 |
| JP | 2005-232367 | 9/2005 |
| WO | WO 97/36724 | 10/1997 |
| WO | WO 99/16600 | 4/1999 |
| WO | WO 02/10269 A2 | 2/2002 |
| WO | WO 03/016837 A1 | 2/2003 |
| WO | WO 03/037946 A | 5/2003 |
| WO | WO 2005/087859 A2 | 9/2005 |
| WO | WO 2006/061064 A1 | 6/2006 |
| WO | WO 2006/069792 A1 | 7/2006 |
| WO | WO 2006/069793 A1 | 7/2006 |
| WO | WO 2006/076629 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/017060 A1 | 2/2007 |
| WO | WO 2008/003434 A1 | 1/2008 |
| WO | WO 2008/003435 A1 | 1/2008 |

\* cited by examiner

ELASTOMER MIXTURE MAINLY COMPRISING A DIENE ELASTOMER COUPLED BY AN AMINOALKOXYSILANE GROUP, RUBBER COMPOSITION INCLUDING THE SAME AND METHODS FOR OBTAINING SAME

The present invention relates to a modified diene elastomer predominantly coupled by an alkoxysilane group bearing a tertiary or secondary amine functional group and also to a reinforced rubber composition, in particular that can be used for the manufacture of tyres, which comprises this elastomer and has improved dynamic and mechanical properties in the vulcanized state, and also improved processing in the uncured state. Now that savings in fuel and the need to protect the environment have become a priority, it is desirable to produce mixtures having good mechanical properties and a hysteresis which is as low as possible in order to be able to employ them in the form of rubber compositions that can be used in the manufacture of various semi-finished products incorporated into the composition of tyre covers, such as, for example, underlayers, side walls, treads, and in order to obtain tyres having a reduced rolling resistance.

The reduction of the hysteresis of the mixtures is a permanent objective which must however be carried out while retaining the processability of the mixtures.

In order to achieve the objective of a drop in hysteresis, numerous solutions have already been tested. In particular, mention may be made of the modification of the structure of the diene polymers and copolymers at the end of polymerization by means of functionalizing, coupling or star-branching agents for the purpose of obtaining a good interaction between the polymer thus modified and the filler, whether it be carbon black or a reinforcing inorganic filler.

Patent applications EP-A-0 590 491 and EP-A-0 593 049 describe, for example, polymers bearing amine functional groups which make possible a better interaction between the polymer and the carbon black.

Within the context of mixtures containing a reinforcing inorganic filler, it has been proposed, in particular, to use diene polymers functionalized by alkoxysilane derivatives.

By way of illustration of this prior art relating to reinforcing inorganic fillers, mention may, for example, be made of the U.S. Pat. No. 5,066,721, which describes a rubber composition comprising a diene polymer functionalized by an alkoxysilane having at least one non-hydrolysable alkoxy residue as a mixture with silica. Mention may also be made of patent application EP-A-0 299 074 which describes functionalized polymers comprising alkoxysilane functional groups at the chain end. These functionalized polymers were described in the prior art as effective in reducing hysteresis and improving abrasion resistance; however, their properties remain inadequate for allowing the use of these polymers in compositions intended to constitute tyre treads.

It has also been proposed to combine functionalization by amine functional groups with functionalization by alkoxysilane functional groups. Thus, patent EP 0 992 537 describes a rubber composition which comprises an extended elastomer modified at the chain end by an alkoxysilane functional group and bearing at the other end, or along its chain, one or more amine functional groups.

Furthermore, it has also been proposed to improve the properties of rubber compositions by using elastomers functionalized at the chain end by alkoxysilane functional groups bearing an amine group, whether this is as a black, silica or hybrid mixture. Various functionalization processes have thus been described, involving functionalizing agents of alkoxysilane type bearing an amine group.

Mention may be made, for example, of U.S. Pat. No. 5,015,692 or else patent EP 0 341 496 which propose a process for functionalizing elastomers via compounds such as phosphorus compounds, nitro compounds, aminosilanes, acrylamides and aminovinylsilanes, where appropriate combined with a coupling or star-branching with a silicon-based or tin-based compound, with a view to improving the impact resilience of rubber compositions containing them. These patents especially describe rubber compositions reinforced with carbon black that contain a polybutadiene functionalized at the chain end by an alkoxysilane bearing an amine group. Patent application US 2005/0203251 itself describes a silica-reinforced rubber composition containing an elastomer functionalized at the chain end by an alkoxysilane bearing a tertiary amine group.

The functionalization of elastomers at the chain end by alkoxysilane functional groups bearing a cyclic or non-cyclic amine group is also described in patent application JP 2001158834. The rubber composition containing this type of functionalized elastomer is broken down into several variants which are the subject of patent applications JP 2001158835, JP 2001158836 and JP 2001158837.

The chain-end functionalization of an elastomer by reaction with an alkoxysilane compound bearing an unsaturated cyclic amine group, such as the pyridyl group, is illustrated in patent application JP 2005232367.

Patent application JP 2001131230 relates to the chain-end functionalization of elastomers bearing, at the other chain end, an amine functional group, by various alkoxysilane compounds bearing cyclic or non-cyclic tertiary amine groups.

Other patent applications or patents relate to various functionalization processes, for example via alkoxysilane compounds bearing an imine group, such as patent application JP 2001131340 and patent EP 1 113 024 (the elastomer of which is used in variants of compositions that are the subject of applications JP 2001131343, JP 2001131344, JP 2001131345 and JP 2005171034) or else via compounds of cyclic azalkoxysilane type, such as in international application WO 2006/076629, for preparing elastomers functionalized at the chain end by alkoxysilane functional groups bearing a secondary amine group.

However, it turns out that the compositions containing elastomers thus modified, whether they are a black, silica or hybrid mixture, still do not exhibit acceptable processability and satisfactory hysteresis for use as a tyre tread.

This is why research has been carried out on other functionalization reactions, with a view to obtaining rubber compositions that have an improved processing in the uncured state/hysteresis compromise.

The objective of the present invention is therefore to propose such a composition. In particular, one objective is to propose a functionalized elastomer that interacts satisfactorily with the reinforcing filler of a rubber composition containing it in order to improve the mechanical and dynamic properties, while retaining a satisfactory processing in the uncured state, especially with a view to use as a tyre tread.

This objective is achieved in that the inventors have just surprisingly discovered during their research that the coupling of elastomers by alkoxysilane functional groups bearing a tertiary or secondary amine group gives the compositions containing them a remarkable and unexpected improvement in the processing in the uncured state/hysteresis compromise. These coupled elastomers make it possible to significantly reduce, for the rubber compositions containing them, in the crosslinked state, the degree of hysteresis and to improve the mechanical properties while optimizing their processability in the uncrosslinked state.

Indeed, on the one hand the processing in the uncured state of such compositions is similar to that of a composition containing unfunctionalized elastomers, or even better. On the other hand, the mechanical and dynamic properties of such compositions are greatly improved relative to those of compositions containing chain-end functionalized elastomers especially relative to those of compositions containing elastomers that are functionalized at the chain end by alkoxysilane functional groups bearing an amine group.

One subject of the invention is therefore an elastomer mixture, resulting from the modification of a diene elastomer by a coupling agent that introduces, into the elastomer chain, an alkoxysilane group bearing a tertiary or secondary amine functional group, said mixture predominantly (i.e. for more than 50% by weight) comprising the diene elastomer coupled by the alkoxysilane group bearing a tertiary or secondary amine functional group bonded to the diene elastomer through the silicon atom. The process for preparing this mixture is also one subject of the invention. This elastomer mixture is also denoted in the text by the expression "diene elastomer predominantly coupled by an alkoxysilane group bearing a tertiary or secondary amine functional group".

Another subject of the invention is a reinforced rubber composition based on at least one reinforcing filler and on an elastomer matrix comprising at least one diene elastomer predominantly coupled by an alkoxysilane group bearing a tertiary or secondary amine functional group.

The present invention also relates to a process for preparing a reinforced rubber composition based on at least one reinforcing filler and on an elastomer matrix comprising at least one diene elastomer predominantly coupled by an alkoxysilane group bearing a tertiary or secondary amine functional group bonded to the diene elastomer by the silicon atom.

In the text the expressions "alkoxysilane bearing a tertiary or secondary amine functional group", "amine-alkoxysilane" and "aminoalkoxysilane" have the same meaning and may be used indifferently, one for the other. Within the context of the invention it should be noted that the amine group is not a primary amine.

The expression "composition based on" should be understood to mean a composition comprising the mixture and/or the reaction product of the various constituents used, some of these base constituents being capable of reacting, or intended to react, together, at least partly, during various manufacturing phases of the composition, in particular during its crosslinking or vulcanization.

In the present description, unless expressly indicated otherwise, all the percentages (%) indicated are % by weight. Moreover, any interval of values denoted by the expression "between a and b" represents the field of values ranging from more than a to less than b (that is to say limits a and b excluded) whereas any interval of values denoted by the expression "from a to b" signifies, the field of values ranging from a up to b (that is to say including the strict limits a and b).

A first subject of the invention is therefore an elastomer mixture resulting from the modification of a diene elastomer by a coupling agent that introduces, into the elastomer chain, an aminoalkoxysilane group, this mixture comprising, relative to the total weight of the mixture resulting from this modification, more than 50% by weight of a diene elastomer coupled by an aminoalkoxysilane group. Indeed, during such a modification of a diene elastomer, several elastomer species are recovered (chain-end functionalized elastomer, unfunctionalized elastomer, coupled elastomer, etc.) that form an elastomer mixture. Preferably, this diene elastomer coupled by an aminoalkoxysilane group is present in this mixture in an amount of at least 65% by weight, more preferably still 75% by weight, relative to the total weight of the elastomer mixture.

Still according to the invention, the expression "diene elastomer coupled by an aminoalkoxysilane group" is understood to mean a diene elastomer having the aminoalkoxysilane group within its polymer chain, especially in the middle of the chain, the silicon atom of this aminoalkoxysilane group bonding the two pieces of the chain of the diene elastomer.

The expression "diene elastomer" should be understood in a known manner to mean an (this means one or more) elastomer derived at least in part (i.e., a homopolymer or a copolymer) from diene monomers (monomers bearing two conjugated or unconjugated carbon-carbon double bonds). More particularly, the expression "diene elastomer" is understood to mean any homopolymer obtained by polymerization of a conjugated diene monomer having 4 to 12 carbon atoms, or any copolymer obtained by copolymerization of one or more conjugated dienes with one another or with one or more vinylaromatic compounds having from 8 to 20 carbon atoms. In the case of copolymers, these contain from 20% to 99% by weight of diene units, and from 1 to 80% by weight of vinylaromatic units.

Suitable conjugated dienes which can be used in the process according to the invention are in particular 1,3-butadiene, 2-methyl-1,3-butadiene, 2,3-di($C_1$ to $C_5$ alkyl)-1,3-butadienes such as, for example, 2,3-dimethyl-1,3-butadiene, 2,3-diethyl-1,3-butadiene, 2-methyl-3-ethyl-1,3-butadiene, or 2-methyl-3-isopropyl-1,3-butadiene, phenyl-1,3-butadiene, 1,3-pentadiene, 2,4-hexadiene, etc.

Suitable vinylaromatic compounds are in particular styrene, ortho-, meta- or para-methylstyrene, the "vinyltoluene" commercial mixture, para-(tert-butyl)styrene, methoxystyrenes, vinylmesitylene, divinylbenzene, vinylnaphthalene, etc.

The diene elastomer of the composition according to the invention is preferably chosen from the group of highly unsaturated diene elastomers formed by polybutadienes (BR), synthetic polyisoprenes (IR), butadiene copolymers, isoprene copolymers and mixtures of these elastomers. Such copolymers are more preferably chosen from the group formed by copolymers of butadiene and of a vinylaromatic monomer, more particularly the butadiene/styrene copolymer (SBR), isoprene/butadiene copolymers (BIR), copolymers of isoprene and of a vinylaromatic monomer, more particularly the isoprene/styrene copolymer (SIR) and isoprene/butadiene/styrene copolymers (SBIR). Among these copolymers, the copolymers of butadiene and of a vinylaromatic monomer, more particularly the butadiene/styrene copolymer (SBR), are particularly preferred.

Especially suitable are polybutadienes having a content (mol %) of 1,2-units between 4% and 80% or those having a cis-1,4-content (mol %) greater than 80%, polyisoprenes, butadiene/styrene copolymers and in particular those having a $T_g$ (glass transition temperature measured according to ASTM D3418) between 0° C. and −70° C. and more particularly between −10° C. and −60° C., a styrene content between 5% and 60%, and more particularly between 20% and 50%, by weight, a content (mol %) of 1,2-bonds of the butadiene part between 4% and 75%, a content (mol %) of trans-1,4-bonds between 10% and 80%, butadiene/isoprene copolymers and especially those having an isoprene content between 5% and 90% by weight and a $T_g$ of −40° C. to −80° C., isoprene/styrene copolymers and especially those having a styrene content between 5% and 50% by weight and a $T_g$ between −25° C. and −50° C.

In the case of butadiene/styrene/isoprene copolymers, those which are especially suitable have a styrene content between 5% and 50%, and more particularly between 10% and 40%, by weight, an isoprene content between 15% and 60%, and more particularly between 20% and 50%, by weight, a butadiene content between 5% and 50%, and more particularly between 20% and 40%, by weight, a content (mol %) of 1,2-units of the butadiene part between 4% and 85%, a content (mol %) of trans-1,4-units of the butadiene part between 6% and 80%, a content (mol %) of 1,2-units plus 3,4-units of the isoprene part between 5% and 70% and a content (mol %) of trans-1,4-units of the isoprene part between 10% and 50%, and are more generally any butadiene/styrene/isoprene copolymer having a $T_g$ between −20° C. and −70° C.

According to one implementation of the invention, the coupled diene elastomer, in the majority in the elastomer mixture, may be represented by one of the formulae I, II or III:

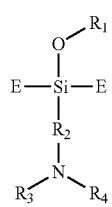

Formula (I)

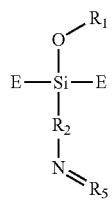

Formula (II)

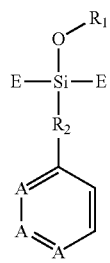

Formula (III)

in which:
the symbol E denotes the diene elastomer as defined above;
$R_1$ denotes a linear or branched, $C_1$-$C_{10}$ alkyl radical, a $C_5$-$C_{18}$ cycloalkyl radical, a $C_6$-$C_{18}$ aryl radical or a $C_7$-$C_{18}$ aralkyl radical, preferably a $C_1$-$C_4$ alkyl radical, more preferably a methyl or ethyl radical;
$R_2$ is a linear or branched, divalent, hydrocarbon-based $C_1$-$C_{10}$ alkyl, $C_6$-$C_{18}$ aryl or $C_7$-$C_{18}$ aralkyl derivative, preferably a $C_1$-$C_{10}$ alkylene radical, more preferably propane-1,3-diyl radical;
in formula (I), $R_3$ and $R_4$, which are identical or different, represent a hydrogen atom or a $C_1$-$C_{10}$ alkyl, preferably $C_1$-$C_4$ alkyl, more preferably methyl or ethyl radical, on condition that when one of $R_3$ and $R_4$ represents a hydrogen atom the other is different, or else $R_3$ and $R_4$ form, with N to which they are bonded, a heterocycle containing a nitrogen atom and at least one carbon atom, preferably 2 to 6 carbon atoms;

in formula (II), $R_5$ represents a linear or branched, $C_1$-$C_{10}$ alkylidene, preferably $C_2$-$C_6$ alkylidene radical, more preferably a linear or branched $C_4$-$C_6$ alkylidene radical; according to one variant of the invention $R_5$ denotes a branched $C_3$-$C_6$ alkylidene radical, preferably the 3-(1, 3-dimethylbutylidene) radical;
in formula (III), the symbols A denote, independently of one another, a nitrogen atom or a carbon atom, on condition that at least one of the symbols A denotes a nitrogen atom, according to one variant of the invention a single A denotes a nitrogen atom, preferably in the meta or para position of the ring, more preferably in the para position of the ring.

The diene elastomer predominantly coupled by an aminoalkoxysilane group bonded to the diene elastomer by the silicon atom may be prepared according to a process which consists firstly of an anionic polymerization of at least one conjugated diene monomer, as defined above, in the presence of an initiator, then secondly of the reaction of the living polymer thus obtained with a specific coupling agent. This process is also a subject of the invention.

Use may be made, as polymerization initiator, of any known monofunctional anionic initiator. However, an initiator comprising an alkali metal, such as lithium, is preferably used. Suitable organolithium initiators are in particular those comprising a carbon-lithium bond. Representative compounds are aliphatic organolithium compounds, such as ethyllithium, n-butyllithium (n BuLi), isobutyllithium, etc. Lithium amides, which are obtained from a cyclic secondary amine, such as pyrrolidine and hexamethyleneimine, and which are soluble in a hydrocarbon solvent without use of a solvating agent are highly preferred.

The polymerization is preferably carried out in the presence of an inert hydrocarbon solvent which may, for example, be an aliphatic or alicyclic hydrocarbon, such as pentane, hexane, heptane, isooctane, cyclohexane or methylcyclohexane, or an aromatic hydrocarbon, such as benzene, toluene or xylene.

The polymerization may be carried out continuously or batchwise. The polymerization is generally carried out at a temperature of between 20° C. and 150° C. and preferably in the vicinity of 30° C. to 110° C.

The coupling reaction of the living diene polymer, obtained at the end of the first stage, may take place at a temperature between −20° C. and 100° C., by addition to the living polymer chains, or vice versa, of a non-polymerizable coupling agent capable of forming an aminoalkoxysilane group that bonds two elastomer chains by its silicon atom. This non-polymerizable coupling agent makes it possible, in particular, to obtain the structures of formulae I, II and III described above. It may be, for example, an aminotrialkoxysilane compound.

As coupling agent, mention may be made, for example, of N,N-dialkylaminopropyl-trialkoxysilanes, cyclic azadialkoxysilanes such as N-alkyl-aza-dialkoxysilacycloalkane, 2-pyridylethyltrialkoxysilanes, 3-carbazolethyltrialkoxysilanes, 3-alkylideneamino-propyltrialkoxysilanes, N-trialkoxysilylpropylmorpholine. The alkyl, alkylidene and alkoxy substituents of these agents are linear or branched and generally have between 1 and 18, preferably between 1 and 10, or even between 1 and 8 carbon atoms.

Preferably, the coupling agent is chosen from 3-(N,N-dimethylaminopropyl)-trimethoxysilane of CAS number [2530-86-1], 2-(4-pyridylethyl)triethoxysilane of CAS number [98299-74-2], 2-[2-(trimethoxysilyl)ethyl]pyridine of CAS number [27326-65-4], 3-(1,3-dimethylbutylidene)aminopropyltriethoxysilane of CAS number [198567-47-4], N-n-butyl-aza-2,2-dimethoxysilacyclopentane of CAS number [618914-44-6]. More preferably still, the coupling agent is 3-(N,N-dimethylaminopropyl)trimethoxysilane.

The mixing may be carried out by any appropriate means, especially using any mixer having stirring of static type and/or any dynamic mixer of perfectly stirred type known by a person skilled in the art. The reaction time between the living diene polymer and the coupling agent may be between 10 seconds and 2 hours.

For the coupling reaction, the molar ratio between the coupling agent and the metal of the initiator of the living polymer chains is from 0.3 to 0.8, preferably from 0.4 to 0.65 and more preferably still from 0.45 to 0.55.

Another subject of the invention is a reinforced rubber composition based on at least one reinforcing filler and an elastomer matrix comprising at least one diene elastomer predominantly coupled by an aminoalkoxysilane group as described above.

The reinforced rubber composition according to the invention may be in the crosslinked state or in the uncrosslinked state, otherwise known as the crosslinkable state.

It should be understood that the composition of the invention may comprise one or more of these diene elastomers predominantly coupled by an aminoalkoxysilane group, Thus, the diene elastomer predominantly coupled by an aminoalkoxysilane group bonded to the diene elastomer by the silicon atom may be, according to the invention, used alone in the composition or as a blend with any conventional diene elastomer, whether it is star-branched, coupled, functionalized or unfunctionalized, with any synthetic elastomer other than a diene elastomer, or even with any polymer other than an elastomer, for example a thermoplastic polymer, which is conventionally used in tyres.

It will be noted that the improvement in the properties of the composition according to the invention will be even higher when the proportion of the elastomer(s) different from those of the invention in this composition is lower. This is why, according to one preferred variant of the invention, the reinforced rubber composition is based on an elastomer matrix predominantly comprising the diene elastomer predominantly coupled by an aminoalkoxysilane group bonded to the diene elastomer by the silicon atom. When the conventional elastomer used as a blend is natural rubber and/or one or more unfunctionalized diene polymers such as, for example, polybutadienes, polyisoprenes, butadiene/styrene or butadiene/styrene/isoprene copolymers, this elastomer may then be present at 1 to 70 parts by weight per 100 parts of diene elastomer predominantly coupled by an aminoalkoxysilane group. More preferably, this matrix is only constituted of this diene elastomer predominantly coupled by an aminoalkoxysilane group.

When the conventional elastomer used as a blend is a diene elastomer that is star-branched, coupled or functionalized with an agent other than the one that makes it possible to obtain the diene elastomer predominantly coupled by an aminoalkoxysilane group, this elastomer may, according to one implementation of the invention, be present in an amount of 1 to 100 parts by weight per 100 parts by weight of diene elastomer predominantly coupled by an aminoalkoxysilane group.

Thus, according to another variant of the invention, provision may also be made for an additional star-branching of the diene elastomer predominantly coupled by an aminoalkoxysilane group. This variant is advantageously carried out in order to reduce the flow of the elastomer matrix in the uncured state. The process for preparing the diene elastomer predominantly coupled by an aminoalkoxysilane group may then comprise a step of star-branching by reaction with a star-branching agent that is known per se, for example based on tin or on silicon.

The rubber composition of the invention comprises, besides at least one elastomer matrix comprising a predominantly coupled diene elastomer having, in the middle of the chain, an aminoalkoxysilane group bonded to the diene elastomer by the silicon atom, as described above, at least one reinforcing filler.

It is possible to use any type of reinforcing filler known for its abilities to reinforce a rubber composition that can be used for manufacturing tyre treads, for example an organic filler such as carbon black, a reinforcing inorganic filler such as silica, or else a blend of these two types of filler, especially a blend of carbon black and silica. Suitable carbon blacks are all carbon blacks, in particular blacks of the HAF, ISAF and SAF types, conventionally used in tyre treads (blacks known as tyre-grade blacks). Among the latter, mention will more particularly be made of reinforcing carbon blacks of the 100, 200 or 300 series (ASTM grades) such as, for example, the blacks N115, N134, N234, N326, N330, N339, N347 and N375. The carbon blacks could, for example, already be incorporated into the isoprene elastomer in the form of a masterbatch (see, for example, applications WO 97/36724 or WO 99/16600).

As examples of organic fillers other than carbon blacks, mention may be made of functionalized aromatic vinyl polymer organic fillers as described in applications WO-A-2006/069792 and WO-A-2006/069793, or else the functionalized non-aromatic vinyl polymer organic fillers as described in applications WO-A-2008/003434 and WO-A-2008/003435.

The expression "reinforcing inorganic filler" should be understood to mean, in the present application, by definition, any inorganic or mineral filler, whatever its colour and its origin (natural or synthetic), also known as "white" filler, "clear" filler, or even "non-black" filler, in contrast to carbon black, this inorganic filler being capable of reinforcing, by itself alone, without means other than an intermediate coupling agent, a rubber composition intended for the manufacture of tyres, in other words capable of replacing, in its reinforcing role, a conventional carbon black of tyre grade. Such a filler is generally characterized, in a known way, by the presence of hydroxyl (—OH) groups at its surface.

The physical state in which the reinforcing inorganic filler is present is not important, whether it is in the form of a powder, microbeads, granules or beads, or any other appropriate densified form. Of course, reinforcing inorganic filler is also understood to mean mixtures of various reinforcing inorganic fillers, in particular of highly dispersible siliceous and/or aluminous fillers as described above.

Suitable reinforcing inorganic fillers are especially mineral fillers of the siliceous type, in particular silica ($SiO_2$), or of the aluminous type, in particular alumina ($Al_2O_3$). The silica used may be any reinforcing silica known to a person skilled in the art, especially any precipitated or fumed silica having a BET surface area and also a CTAB specific surface area that are both less than 450 $m^2/g$, preferably from 30 to 400 $m^2/g$. Mention will be made, as highly dispersible ("HDS") precipitated silicas, for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in Application WO 03/16837.

The reinforcing inorganic filler used, in particular if it is silica, preferably has a BET surface area of between 45 and 400 $m^2/g$, more preferably of between 60 and 300 $m^2/g$.

Preferably, the content of total reinforcing filler (carbon black and/or reinforcing inorganic filler, such as silica) is between 50 and 200 phr, more preferably between 60 and 140 phr, more preferably still between 70 and 130 phr, the optimum being in a known way different depending on the specific applications targeted: the level of reinforcement expected with regard to a bicycle tyre, for example, is, of course, less than that required with regard to a tyre capable of running at high speed in a sustained manner, for example a motorcycle tyre, a tyre for a passenger vehicle or a tyre for a utility vehicle, such as a heavy duty vehicle.

According to one variant of the invention, use is made of a reinforcing filler comprising a reinforcing inorganic filler in a weight fraction of between 50% and 100%, particularly silica, and optionally silica or another inorganic filler.

According to another variant of the invention, especially when the composition is intended for manufacturing tread for a tyre for a utility vehicle, such as a heavy duty vehicle, use is made of a reinforcing filler comprising a reinforcing organic filler in a weight fraction ranging from 50% to 100%, particularly carbon black, and optionally silica or another inorganic filler.

According to one embodiment variant of the invention, use is made of a reinforcing filler comprising between 50 and 150 phr, more preferably between 50 and 120 phr, of inorganic filler, particularly silica, and optionally carbon black; the carbon black, when it is present, is preferably used in this variant at a content of less than 30 phr, more preferably of less than 20 phr (for example between 0.1 and 10 phr).

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler and the diene elastomer, in particular bifunctional organosilanes or polyorganosiloxanes.

Use is made in particular of silane polysulphides, referred to as "symmetrical" or "asymmetrical" depending on their specific structure, as described, for example, in applications WO 03/002648 (or US 2005/016651) and WO 03/002649 (or US 2045/016650).

Suitable in particular, without the definition below being limiting, are symmetrical silane polysulphides corresponding to the following general formula (I):

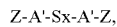
(I)

in which:
x is an integer from 2 to 8 (preferably from 2 to 5);
A' is a divalent hydrocarbon-based radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, in particular propylene);
Z corresponds to one of the following formulae:

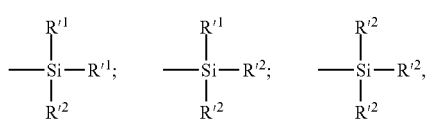

in which:
the substituted or unsubstituted R'1 radicals, which are identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the substituted or unsubstituted R'2 radicals, which are identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

Mention will more particularly be made, as examples of silane polysulphides, of bis(3-trimethoxysilylpropyl) or bis (3-triethoxysilylpropyl) polysulphides. Use is in particular made, among these compounds, of bis(3-triethoxysilylpropyl) tetrasulphide, abbreviated to TESPT, or bis(triethoxysilylpropyl) disulphide, abbreviated to TESPD. Mention will also be made, as preferred examples, of bis(mono($C_1$-$C_4$) alkoxyldi($C_1$-$C_4$)alkylsilyl-propyl) polysulphides (in particular disulphides, trisulphides or tetrasulphides), more particularly bis(monoethoxydimethylsilylpropyl) tetrasulphide, as described in patent application WO 02/083782 (or US 2004/132880).

Mention will in particular be made, as coupling agent other than alkoxysilane polysulphide, of bifunctional POSs (polyorganosiloxanes) or else of hydroxysilane polysulphides, such as described in patent applications WO 02/30939 (or U.S. Pat. No. 6,774,255) and WO 02/31041 (or US 2004/ 051210), or else of silanes or POSs bearing azodicarbonyl functional groups, such as described, for example, in patent applications WO 2006/125532, WO 2006/125533 and WO 2006/125534.

In the compositions in accordance with the invention, the content of coupling agent is advantageously less than 20 phr, it being understood that it is generally desirable to use the least amount possible thereof. Its content is preferably between 0.5 and 12 phr, more preferably from 3 to 10 phr, in particular from 4 to 7 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to form the connection between the filler and the elastomer.

The rubber compositions in accordance with the invention may also contain, in addition to coupling agents, coupling activators, agents for covering the inorganic fillers or more generally processing aids capable, in a known manner, by virtue of an improvement in the dispersion of the filler in the rubber matrix and of a reduction in the viscosity of the compositions, of improving their ease of processing in the uncured state, these agents or aids being, for example, hydrolysable silanes such as alkylalkoxysilanes, polyols, polyethers, primary, secondary or tertiary amines, or hydroxylated or hydrolysable polyorganosiloxanes.

The rubber compositions in accordance with the invention may also comprise all or some of the usual additives customarily used in elastomer compositions intended for the manufacture of tyres, such as, for example, pigments, non-reinforcing fillers, protection agents, such as antiozone waxes, chemical antiozonants, antioxidants, antifatigue agents, plasticizing agents, reinforcing or plasticizing resins, methylene acceptors (for example, phenolic novolac resin) or methylene donors (for example, HMT or H3M) as described, for example, in application WO 02/10269, a crosslinking system based either on sulphur or on sulphur donors and/or on peroxide and/or on bismaleimides, vulcanization accelerators and vulcanization activators.

The compositions of the invention may also comprise, as preferred non-aromatic or very slightly aromatic plasticizing agent, at least one compound chosen from the group constituted by naphthenic or paraffinic oils, MES oils, TDAE oils, ester plasticizers (for example glycerol trioleates), hydrocarbon-based resins having a high $T_g$, preferably above 30° C., as described, for example, in applications WO 2005/087859, WO 2006/061064 and WO 2007/017060, and mixtures of such compounds. The overall content of such a preferred plasticizing agent is preferably between 10 and 100 phr, more preferably between 10 and 80 phr, especially within a range of 20 to 50 phr.

Another subject of the invention is a process for preparing a reinforced rubber composition in accordance with the invention. This process comprises:
(i) carrying out, at a maximum temperature of between 130° C. and 200° C., a first step of thermomechanical working (sometimes described as "non-productive" phase) of the base constituents necessary, with the exception of the crosslinking system, for said composition comprising the diene elastomer predominantly coupled by an aminoalkoxysilane group bonded to the diene elastomer by the silicon atom, and a reinforcing filler, with the exception of a crosslinking system, then
(ii) carrying out, at a temperature below said maximum temperature of said first step, preferably below 120° C., a second step of mechanical working during which said crosslinking system is incorporated.

The rubber composition thus obtained may then be extruded or calendered in a manner known per se, in the desired form, in order to manufacture semi-finished products, such as treads.

This process may also comprise, prior to carrying out the aforementioned steps (i) and (ii), the steps of preparing the diene elastomer predominantly coupled by an aminoalkoxysilane group bonded to the diene elastomer by the silicon atom according to the process described above.

Another subject of the invention is a tyre that incorporates, in at least one of its constituent components, a reinforced rubber composition according to the invention, and more particularly semi-finished articles of a tyre that comprise this composition. Due to the reduced hysteresis which characterizes a reinforced rubber composition according to the invention in the vulcanized state, it should be noted that a tyre having a tread comprising said composition exhibits an advantageously reduced rolling resistance. Another subject of the invention is therefore a tyre tread which is such that it comprises a crosslinkable or crosslinked reinforced rubber composition according to the invention or else which is such that it is composed of this composition.

The aforementioned features of the present invention, and others, will be better understood on reading the following description of several exemplary embodiments of the invention, given by way of illustration and non-limitingly.

ELASTOMER PREPARATION EXAMPLES

Measurements and Tests Used

Experimental Techniques Used for the Pre-Curing Characterization of the Polymers Obtained (a) The SEC (Size Exclusion Chromatography) technique is used, which makes it possible to separate the macromolecules in solution, according to their size, through columns filled with a porous gel. The macromolecules are separated according to their hydrodynamic volume, the bulkiest being eluted first.

Without being an absolute method, SEC makes it possible to determine the distribution of the molecular weights of a polymer. From commercial standard products, the various number-average molecular weights ($M_n$) and weight-average molecular weights ($M_w$) can be determined and the polydispersity index ($I_p = M_w/M_n$) calculated via a "Moore" calibration.

There is no particular treatment of the polymer sample before analysis. This sample is simply dissolved in the elution solvent at a concentration of around 1 g/l. Then the solution is filtered through a filter with a porosity of 0.45 μm before injection.

The equipment used is a "Waters Alliance" chromatograph. The elution solvent is either tetrahydrofuran or tetrahydrofuran+1 vol % of diisopropylamine+1 vol % of triethylamine, the flow rate is 1 ml/min, the temperature of the system is 35° C. and the analysis time is 30 min. A set of two Waters columns having the trade name Styragel HT6E is used. The injected volume of the solution of the polymer sample is 100 μl. The detector is a Waters 2410 differential refractometer and the operating software for the chromatographic data is the Waters Empower system.

The average molecular weights calculated are relative to a calibration curve produced for SBRs having the following microstructure: 25 wt % of styrene type units, 23 wt % of 1,2-type units and 50 wt % of trans-1,4-type units.

The weight proportion of chains that have not undergone coupling is estimated by the mathematical breakdown of the chromatograms obtained by SEC to the sum of Gaussian distributions (assuming that the response coefficients of the refractometric detector (dn/de) of the various species present are identical).

(b) For the polymers and the rubber compositions, the Mooney viscosities ML (1+4) at 100° C. are measured according to the ASTM D 1646 standard.

Use is made of an oscillating consistometer as described in the ASTM D 1646 standard. The Mooney plasticity measurement is carried out according to the following principle: the composition in the uncured state (i.e. before curing) is moulded in a cylindrical chamber heated to 100° C. After preheating for one minute, the rotor rotates within the test specimen at 2 rpm and the working torque for maintaining this movement is measured after rotating for four minutes. The Mooney plasticity (ML 1+4) is expressed in "Mooney units" (MU, with 1 MU=0.83 N.m).

(c) The glass transition temperatures $T_g$ of the polymers are measured using a differential scanning calorimeter.

(d) The NMR analyses are carried out on a 500 MHz Bruker spectrometer equipped with a 5 mm BBIz "broadband" probe. For the quantitative $^1H$ NMR experiment, the sequence uses a 30° pulse and a repetition time of two seconds. The samples are dissolved in carbon sulphide ($CS_2$). 100 μL of deuterated cyclohexane ($C_6D_{12}$) are added for the lock signal.

The $^1H$ NMR spectrum makes it possible to quantify the $(CH_3)_2Si$ functional group by integration of the signal characteristic of the $SiCH_3$ protons in the vicinity of δ=0 ppm. The 2D $^1H$-$^{29}Si$ NMR spectrum makes it possible to verify the nature of the functional group by virtue of the chemical shift values of the silicon nuclei and of the protons in the 2J vicinity (via 2 bonds).

(e) Near infrared (NIR) spectroscopy is used to quantitatively determine the weight content of styrene in the elastomer and also its microstructure (relative distribution of the 1,2-vinyl, trans-1,4- and cis-1,4-butadiene units). The principle of the method rests on the Beer-Lambert law applied to a multicomponent system. Since the method is indirect, it calls for a multivariate calibration [Vilmin, Dussap, C.; Coste, N. *Applied Spectroscopy* 2006, 60, 619-29] carried out using standard elastomers having a composition determined by $^{13}C$ NMR. The styrene content and the microstructure are then calculated from the NIR spectrum of an elastomer film of around 730 μm in thickness. The acquisition of the spectrum is carried out in transmission mode between 4000 and 6200 $cm^{-1}$ with a resolution of 2 $cm^{-1}$, using a Bruker Tensor 37 Fourier transform near infrared spectrometer equipped with a Peltier-cooled InGaAs detector.

(f) For the polymers, the intrinsic viscosity at 25° C. of a 0.1 g/dl solution of polymer in toluene is measured, starting from a dry polymer.

Principle:

The intrinsic viscosity is determined by the measurement of the flow time t of the polymer solution and of the flow time t0 of toluene, in a capillary tube.

The flow time of toluene and the flow time of the 0.1 g/dl polymer solution are measured in a precalibrated Ubbelhode tube (diameter of the capillary: 0.46 mm, capacity of 18 to 22 mL), placed in a bath thermostatically controlled at 25±0.1° C.

The intrinsic viscosity is obtained by the following relationship:

$$\eta_{inh} = \frac{1}{C} \ln\left[\frac{\left(t - \frac{H}{t}\right)}{\left(t_o - \frac{H}{t_o}\right)}\right]$$

with:
C: concentration of the toluene solution of polymer in g/dl;
t: flow time of the toluene solution of polymer in seconds;
to: flow time of the toluene in seconds;
ηinh intrinsic viscosity expressed in dl/g; and
H: calibration constant of the tube.

Preparation of Polymer A: Non-functional SBR—control

Injected into a 70-liter reactor, kept under a nitrogen pressure of around 2 bar, containing 46 kg of methylcyclohexane, are 2.00 kg of styrene and 4.70 kg of butadiene and also 455 mL of a 0.040 $mol.L^{-1}$ solution of tetrahydrofurfuryl ether in methylcyclohexane. After neutralizing the impurities in the solution to be polymerized by addition of n-butyllithium, 375 mL of n-BuLi at 0.067 $mol.L^{-1}$ in methylcyclohexane are added. The polymerization is carried out at 40° C.

After 110 min, the degree of conversion of the monomers reaches 90%. This degree of conversion is determined by weighing an extract dried at 110° C., under a reduced pressure of 200 mmHg.

0.54 L of a 0.15 $mol.L^{-1}$ solution of methanol in toluene is then added. The intrinsic viscosity, which is measured at 25° C. at 0.1 g/dL in toluene, is 1.56 dL/g.

The polymer is then subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill at 100° C. for 15 minutes and finally in an oven at 60° C. under a stream of nitrogen.

The ML viscosity of the copolymer is 53.

The molecular weight $M_n$ of this copolymer, determined by the SEC technique, is 157 000 g/mol and the $I_p$ is 1.11.

The microstructure of this copolymer is determined by the NIR method:

The weight content of trans-1,4-units is 22%, that of cis-1,4-units is 19% and that of 1,2-units is 59% (each of these three contents relates to the butadiene units).

The weight content of styrene is 28%.

Preparation of Polymer B: Chain-end SiOH Functional SBR—control

Injected into a 70-liter reactor, kept under a nitrogen pressure of around 2 bar, containing 45.1 kg of methylcyclohexane, are 2.21 kg of styrene and 5.40 kg of butadiene and also 184 mL of a 0.10 $mol.L^{-1}$ solution of tetrahydrofurfuryl ether in methylcyclohexane. After neutralizing the impurities in the solution to be polymerized by addition of n-butyllithium, 395 mL of n-BuLi at 0.094 $mol.L^{-1}$ in methylcyclohexane are added. The polymerization is carried out at 40° C.

After 100 min, the degree of conversion of the monomers reaches 91%. This degree of conversion is determined by weighing an extract dried at 110° C., under a reduced pressure of 200 mmHg.

186 mL of a 0.10 $mol.L^{-1}$ solution of hexamethylcyclotrisiloxane in methylcyclohexane are then added. After 30 min at 60° C., 0.68 L of a 0.15 $mol.L^{-1}$ solution of methanol in toluene is then added. The polymer is subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill at 100° C. for 15 minutes and finally in an oven at 60° C. under a stream of nitrogen.

The intrinsic viscosity, which is measured at 25° C. at 0.1 g/dL in toluene, is 1.59 dL/g.

The ML viscosity of the copolymer is 55.

The molecular weight $M_n$ of this copolymer, determined by the SEC technique, is 156 000 g/mol and the $I_p$ is 1.15.

The microstructure of this copolymer is determined by the NIR method:

The weight content of trans-1,4-units is 22%, that of cis-1,4-units is 20% and that of 1,2-units is 58% (each of these three contents relates to the butadiene units).

The weight content of styrene is 26%.

The content of $(CH_3)_2Si$ functional groups determined by $^1H$ NMR for this copolymer is 3.38 mmol/kg.

Preparation of Polymer C: Aminoalkoxysilane-coupled SBR according to the Invention Injected into a 70-liter reactor, kept under a nitrogen pressure of around 2 bar, containing 45.3 kg of methylcyclohexane, are 1.93 kg of styrene and 4.73 kg of butadiene and also 605 mL of a 0.040 $mol.L^{-1}$ solution of tetrahydrofurfuryl ether in methylcyclohexane. After neutralizing the impurities in the solution to be polymerized by addition of n-butyllithium, 779 mL of n-BuLi at 0.067 $mol.L^{-1}$ in methylcyclohexane are added. The polymerization is carried out at 40° C.

After 80 min, the degree of conversion of the monomers reaches 90%. This degree of conversion is determined by weighing an extract dried at 110° C., under a reduced pressure of 200 mmHg. A control sample is then withdrawn from the reactor, then halted with an excess of methanol with respect to the lithium. The intrinsic viscosity ("initial" viscosity), which is measured at 25° C. at 0.1 g/dL in toluene, is 1.04 dL/g. The molecular weight $M_n$ of this control, determined by the SEC technique, is 91 300 g/mol, the $I_p$ is 1.08.

1.61 L of a 0.015 mol.L$^{-1}$ solution of 3-(N,N-dimethylaminopropyl)trimethoxysilane with a CAS number of [2530-86-1] in methylcyclohexane is added to the solution of living polymer. After reacting for 20 min at 30° C., the solution is subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine. The copolymer thus treated is separated from its solution by a steam-stripping operation, then it is dried on an open mill at 100° C. for 15 minutes and finally in an oven at 60° C. under a stream of nitrogen.

The "final" intrinsic viscosity measured is 1.56 dL/g. The jump in viscosity, defined as the ratio of said "final" viscosity to said "initial" viscosity, is 1.50 in this instance. The ML viscosity of the polymer thus coupled is 53.

The molecular weight $M_n$ of this copolymer, determined by the SEC technique, is 153 000 g/mol and the $I_p$ is 1.20. The weight percentage of uncoupled linear chains is around 22%.

The microstructure of this copolymer is determined by the NIR method:

The weight content of trans-1,4-units is 22%, that of cis-1,4-units is 19% and that of 1,2-units is 59% (each of these three contents relates to the butadiene units).

The weight content of styrene is 27%.

Preparation of polymer D: Chain-end Aminoalkoxysilane SBR—control

Injected into a 10-liter reactor, kept under a nitrogen pressure of around 2 bar, containing 5.09 kg of methylcyclohexane, are 197 g of styrene and 531 g of butadiene and also 0.60 mL of tetrahydrofurfuryl ether. After neutralizing the impurities in the solution to be polymerized by addition of sec-butyllithium, 3.43 mmol of sec-BuLi are added. The polymerization is carried out at 50° C.

After 37 min, the degree of conversion of the monomers reaches 88%. This degree of conversion is determined by weighing an extract dried at 110° C., under a reduced pressure of 200 mmHg. A control sample is then withdrawn from the reactor, then halted with an excess of methanol with respect to the lithium. The intrinsic viscosity ("initial" viscosity), which is measured at 25° C. at 0.1 g/dL in toluene, is 1.60 dL/g. The molecular weight $M_n$ of this control, determined by the SEC technique, is 147 000 g/mol, the $I_p$ is 1.10.

9.0 mL of a 0.13 mol.L$^{-1}$ solution of hexamethylcyclotrisiloxane in methylcyclohexane are then added. After 30 min at 60° C., 11.2 mL of a 1.17 mol.L$^{-1}$ solution of 3-(N,N-dimethylaminopropyl)trimethoxysilane in methylcyclohexane are injected. After reacting for 30 min at 60° C., 70 mL of a 0.15 mol.L$^{-1}$ solution of methanol in toluene are then added.

The polymer is then subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine. The copolymer thus treated is separated from its solution by a steam-stripping operation, then it is dried on an open mill at 100° C. for 15 minutes.

The "final" intrinsic viscosity measured is 1.70 dL/g. The ML viscosity of the polymer is 54.

The molecular weight $M_n$ of this copolymer, determined by the SEC technique, is 158 000 g/mol and the $I_p$ is 1.19. The mathematical breakdown of the SEC chromatogram to the sum of Gaussian distributions (assuming that the response coefficients of the refractometric detector (dn/dc) of the various populations are identical) indicates the presence of a population of coupled linear chains in a proportion of 10% by weight.

The microstructure of this copolymer is determined by the NIR method:

The weight content of trans-1,4-units is 21%, that of cis-1,4-units is 20% and that of 1,2-units is 59% (each of these three contents relates to the butadiene units).

The weight content of styrene is 26%.

Preparation of Polymer E: Non-functional SBR—control

Injected into a 70-liter reactor, kept under a nitrogen pressure of around 2 bar, containing 47 kg of methylcyclohexane, are 3.57 kg of styrene and 3.17 kg of butadiene and also 61 mL of a 0.040 mol.L$^{-1}$ solution of tetrahydrofurfuryl ether in methylcyclohexane. After neutralizing the impurities in the solution to be polymerized by addition of n-butyllithium, 210 mL of n-BuLi at 0.067 mol.L$^{-1}$ in methylcyclohexane are added. The polymerization is carried out at 50° C.

After 80 min, the degree of conversion of the monomers reaches 54%. This degree of conversion is determined by weighing an extract dried at 110° C., under a reduced pressure of 200 mmHg.

0.32 L of a 0.15 mol.L$^{-1}$ solution of methanol in toluene is then added. The intrinsic viscosity, which is measured at 25° C. at 0.1 g/dL in toluene, is 1.76 dL/g.

The polymer is then subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill at 100° C. for 15 minutes and finally in an oven at 60° C. under a stream of nitrogen.

The ML viscosity of the copolymer is 57.

The molecular weight $M_n$ of this copolymer, determined by the SEC technique, is 162 000 g/mol and the $I_p$ is 1.12.

The microstructure of this copolymer is determined by the NIR method:

The weight content of trans-1,4-units is 45%, that of cis-1,4-units is 31% and that of 1,2-units is 24% (each of these three contents relates to the butadiene units).

The weight content of styrene is 28%.

Preparation of Polymer F: SBR Functionalized with SiOH at the Chain End—control

Injected into a 75-liter reactor, kept under a nitrogen pressure of around 2 bar, containing 49.5 kg of methylcyclohexane, are 2.14 kg of styrene and 5.00 kg of butadiene and also 313 mL of a 0.037 mol.L$^{-1}$ solution of sodium 1,1-dimethylpropylate in methylcyclohexane. After neutralizing the impurities in the solution to be polymerized by addition of n-butyllithium, 539 mL of n-BuLi at 0.065 mol.L$^{-1}$ in methylcyclohexane are added. The polymerization is carried out at 50° C.

After 100 min, the degree of conversion of the monomers reaches 91%. This degree of conversion is determined by weighing an extract dried at 110° C., under a reduced pressure of 200 mmHg.

692 mL of a 0.025 mol.L$^{-1}$ solution of hexamethylcyclotrisiloxane in methylcyclohexane are then added. After 30 min at 60° C., 0.58 L of a 0.15 mol.L$^{-1}$ solution of methanol in toluene is then added. The polymer is subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine.

The copolymer thus treated is separated from its solution by a steam-stripping operation, then it is dried on an open mill at 100° C. for 15 minutes and finally in an oven at 60° C. under a stream of nitrogen.

The intrinsic viscosity, which is measured at 25° C. at 0.1 g/dL in toluene, is 1.69 dL/g.

The ML viscosity of the copolymer is 57.

The molecular weight $M_n$ of this copolymer, determined by the SEC technique, is 165 000 g/mol and the $I_p$ is 1.12.

The microstructure of this copolymer is determined by the NIR method:

The weight content of trans-1,4-units is 41%, that of cis-1,4-units is 33% and that of 1,2-units is 26% (each of these three contents relates to the butadiene units).

The weight content of styrene is 28%.

The content of $(CH_3)_2Si$ functional groups determined by $^1H$ NMR for this copolymer is 4.3 mmol/kg.

Preparation of Polymer G: Aminoalkoxysilane-coupled SBR According to the Invention Injected into a 70-liter reactor, kept under a nitrogen pressure of around 2 bar, containing 46.0 kg of methylcyclohexane, are 3.71 kg of styrene and 3.03 kg of butadiene and also 206 mL of a 0.065 $mol.L^{-1}$ solution of tetrahydrofurfuryl ether in methylcyclohexane. After neutralizing the impurities in the solution to be polymerized by addition of n-butyllithium, 712 mL of n-BuLi at 0.050 $mol.L^{-1}$ in methylcyclohexane are added. The polymerization is carried out at 50° C.

After 65 min, the degree of conversion of the monomers reaches 54%. This degree of conversion is determined by weighing an extract dried at 110° C., under a reduced pressure of 200 mmHg. A control sample is then withdrawn from the reactor, then halted with an excess of methanol with respect to the lithium. The intrinsic viscosity ("initial" viscosity), which is measured at 25° C. at 0.1 g/dL in toluene, is 1.04 dL/g. The molecular weight $M_n$ of this control, determined by the SEC technique, is 87 000 g/mol, the $I_p$ is 1.07.

170 mL of a 0.10 $mol.L^{-1}$ solution of 3-(N,N-dimethylaminopropyl)trimethoxysilane with a CAS number of [2530-86-1] in methylcyclohexane is added to the solution of living polymer. After reacting for 30 min at 30° C., the solution is subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine. The copolymer thus treated is separated from its solution by a steam-stripping operation, then it is dried on an open mill at 100° C. for 15 minutes and finally in an oven at 60° C. under a stream of nitrogen.

The "final" intrinsic viscosity measured is 1.61 dL/g. The jump in viscosity, defined as the ratio of said "final" viscosity to said "initial" viscosity, is 1.54 in this instance. The ML viscosity of the polymer thus coupled is 57.

The molecular weight $M_n$ of this polymer, determined by the SEC technique, is 160 000 g/mol and the $I_p$ is 1.16. The weight percentage of uncoupled linear chains is around 10%.

The microstructure of this copolymer is determined by the NIR method:

The weight content of trans-1,4-units is 46%, that of cis-1,4-units is 31% and that of 1,2-units is 23% (each of these three contents relates to the butadiene units).

The weight content of styrene is 30%.

Preparation of Polymer H: SBR Functionalized with Aminoalkoxysilane at the Chain End—control Injected into a 10-liter reactor, kept under a nitrogen pressure of around 2 bar, containing 5.09 kg of methylcyclohexane, are 291 g of styrene and 437 g of butadiene and also 3.9 mL of tetrahydrofuran. After neutralizing the impurities in the solution to be polymerized by addition of sec-butyllithium, 3.00 mmol of sec-BuLi are added. The polymerization is carried out at 50° C.

After 62 min, the degree of conversion of the monomers reaches 76%. This degree of conversion is determined by weighing an extract dried at 110° C., under a reduced pressure of 200 mmHg. A control sample is then withdrawn from the reactor, then halted with an excess of methanol with respect to the lithium. The intrinsic viscosity ("initial" viscosity), which is measured at 25° C. at 0.1 g/dL in toluene, is 1.7 dL/g. The molecular weight $M_n$ of this control, determined by the SEC technique, is 142 000 g/mol, the $I_p$ is 1.11.

7.7 mL of a 0.13 $mol.L^{-1}$ solution of hexamethylcyclotrisiloxane in methylcyclohexane are then added. After 30 min at 60° C., 13.9 mL of a 0.84 $mol.L^{-1}$ solution of 3-(N,N-dimethylaminopropyl)trimethoxysilane in methylcyclohexane are injected. After reacting for 30 min at 60° C., 200 mL of a solution of methanol (3 equivalents with respect to the lithium) in toluene are added. The polymer is then subjected to an antioxidizing treatment by addition of 0.8 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine. The copolymer thus treated is separated from its solution by a steam-stripping operation, then it is dried on an open mill at 100° C. for 15 minutes.

The "final" intrinsic viscosity measured is 1.82 dL/g. The ML viscosity of the polymer is 52.

The molecular weight $M_n$ of this copolymer, determined by the SEC technique, is 157 000 g/mol and the $I_p$ is 1.18. The mathematical breakdown of the SEC chromatogram to the sum of Gaussian distributions (assuming that the response coefficients of the refractometric detector (dn/dc) of the various populations are identical) indicates the presence of a population of coupled linear chains in a proportion of 8% by weight.

The microstructure of this copolymer is determined by the NIR method:

The weight content of trans-1,4-units is 48%, that of cis-1,4-units is 28% and that of 1,2-units is 24% (each of these three contents relates to the butadiene units).

The weight content of styrene is 29%.

Preparation of Polymer I: Aminoalkoxysilane-coupled SBR According to the Invention

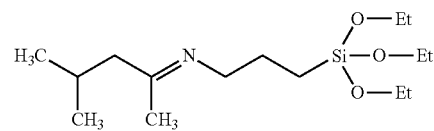

3-(1,3-dimethylbutylidene)aminopropyltriethoxysilane with CAS number [198567-47-4]

Injected into a 10-liter reactor, kept under a nitrogen pressure of around 2 bar, containing 5.24 kg of methylcyclohexane, are 209 g of styrene and 539 g of butadiene and also 0.39 g of tetrahydrofurfuryl ether. After neutralizing the impurities in the solution to be polymerized by addition of n-butyllithium, 6.36 mmol of n-BuLi are added. The polymerization is carried out at 40° C.

After 65 min, the degree of conversion of the monomers reaches 90%. This degree of conversion is determined by weighing an extract dried at 110° C., under a reduced pressure of 200 mmHg. A control sample is then withdrawn from the reactor, then halted with an excess of methanol with respect to the lithium. The intrinsic viscosity ("initial" viscosity), which is measured at 25° C. at 0.1 g/dL in toluene, is 0.98 dL/g. The molecular weight $M_n$ of this control, determined by the SEC technique, is 83 000 g/mol, the $I_p$ is 1.07.

2.93 mmol of 3-(1,3-dimethylbutylidene)aminopropyltriethoxysilane with a CAS number of [198567-47-4] in solution in 50 mL of methylcyclohexane are injected. After reacting for 4 hours at 40° C., 63 mL of a 0.3 mol.L$^{-1}$ solution of methanol in toluene are then added.

The polymer is then subjected to an antioxidizing treatment by addition of 0.2 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine. The copolymer thus prepared is dried under reduced pressure at 60° C.

The "final" intrinsic viscosity measured is 1.66 dL/g. The ML viscosity of the polymer thus coupled is 50. The jump in viscosity, defined as the ratio of said "final" viscosity to said "initial" viscosity, is 1.7 in this instance.

The molecular weight $M_n$ of this copolymer, determined by the SEC technique, is 146 000 g/mol and the $I_p$ is 1.36.

The microstructure of this copolymer is determined by the NIR method:

The weight content of trans-1,4-units is 21%, that of cis-1,4-units is 20% and that of 1,2-units is 59% (each of these three contents relates to the butadiene units).

The weight content of styrene is 28%.

Preparation of Plymer J: Aminoalkoxysilane-coupled SBR According to the Invention

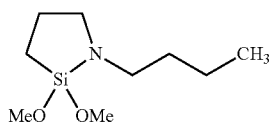

N-n-butyl-aza-2,2-dimethoxysilacyclopentane with CAS number [618914-44-6]

Injected into a 10-liter reactor, kept under a nitrogen pressure of around 2 bar, containing 5.24 kg of methylcyclohexane, are 209 g of styrene and 539 g of butadiene and also 0.36 g of tetrahydrofurfuryl ether. After neutralizing the impurities in the solution to be polymerized by addition of n-butyl-lithium, 5.91 mmol of n-BuLi are added. The polymerization is carried out at 40° C.

After 65 min, the degree of conversion of the monomers reaches 93%. This degree of conversion is determined by weighing an extract dried at 110° C., under a reduced pressure of 200 mmHg. A control sample is then withdrawn from the reactor, then halted with an excess of methanol with respect to the lithium. The intrinsic viscosity ("initial" viscosity), which is measured at 25° C. at 0.1 g/dL in toluene, is 1.11 dL/g. The molecular weight $M_n$ of this control, determined by the SEC technique, is 89 000 g/mol, the $I_p$ is 1.08.

2.72 mmol of N-n-butyl-aza-2,2-dimethoxysilacyclopentane with a CAS number of [618914-44-6] in solution in 50 mL of methylcyclohexane are injected. After reacting for 2 hours at 40° C., 60 mL of a 0.3 mol.L$^{-1}$ solution of methanol in toluene are then added.

The polymer is then subjected to an antioxidizing treatment by addition of 0.2 part per hundred parts of rubbers (phr) of 4,4'-methylenebis(2,6-tert-butylphenol) and 0.2 part per hundred parts of rubbers (phr) of N-(1,3-dimethylbutyl)-N'-phenyl-p-phenylenediamine. The copolymer thus prepared is dried under reduced pressure at 60° C.

The "final" intrinsic viscosity measured is 1.66 dL/g. The ML viscosity of the polymer thus coupled is 50. The jump in viscosity, defined as the ratio of said "final" viscosity to said "initial" viscosity, is 1.5 in this instance.

The molecular weight $M_n$ of this copolymer, determined by the SEC technique, is 151 000 g/mol and the $I_p$ is 1.18.

The microstructure of this copolymer is determined by the NIR method:

The weight content of trans-1,4-units is 21%, that of cis-1,4-units is 20% and that of 1,2-units is 59% (each of these three contents relates to the butadiene units).

The weight content of styrene is 28%.

Preparation of Polymer K: Aminoalkoxysilane-coupled SBR According to the Invention

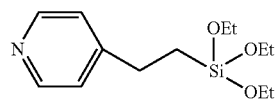

2-(4-pyridylethyl)triethoxysilane

Injected into a 10-liter reactor, kept under a nitrogen pressure of around 2 bar, containing 5.24 kg of methylcyclohexane, are 209 g of styrene and 539 g of butadiene and also 0.36 g of tetrahydrofurfuryl ether. After neutralizing the impurities in the solution to be polymerized by addition of sec-butyl-lithium, 5.91 mmol of sec-BuLi are added. The polymerization is carried out at 40° C.

After 63 min, the degree of conversion of the monomers reaches 93%. This degree of conversion is determined by weighing an extract dried at 110° C., under a reduced pressure of 200 mmHg. A control sample is then withdrawn from the reactor, then halted with an excess of methanol with respect to the lithium. The intrinsic viscosity ("initial" viscosity), which is measured at 25° C. at 0.1 g/dL in toluene, is 0.99 dL/g. The molecular weight $M_n$ of this control, determined by the SEC technique, is 85 000 g/mol, the $I_p$ is 1.07.

0.79 g of 2-(4-pyridylethyl)triethoxysilane in solution in 50 mL of methylcyclohexane are injected. After reacting for 2 hours at 40° C., 60 mL of a 0.3 mol.L$^{-1}$ solution of methanol in toluene are then added.

The polymer is then subjected to an antioxidizing treatment by addition of 0.32 part per hundred parts of rubbers (phr) of 4,4'-methylenebis(2,6-tert-butylphenol) and 0.08 part per hundred parts of rubbers (phr) of N-(1,3-dimethyl-butyl)-N'-phenyl-p-phenylene-diamine. The copolymer thus prepared is dried under reduced pressure at 60° C.

The "final" intrinsic viscosity measured is 1.64 dL/g. The ML viscosity of the polymer thus coupled is 52. The jump in viscosity, defined as the ratio of said "final" viscosity to said "initial" viscosity, is 1.7 in this instance.

The molecular weight $M_n$ of this copolymer, determined by the SEC technique, is 153 000 g/mol and the $I_p$ is 1.14. The weight percentage of uncoupled linear chains is around 10%.

The microstructure of this copolymer is determined by the NIR method:

The weight content of trans-1,4-units is 21%, that of cis-1,4-units is 19% and that of 1,2-units is 60% (each of these three contents relates to the butadiene units).

The weight content of styrene is 25%.

Preparation of Polymer L: Aminoalkoxysilane-coupled SBR According to the Invention

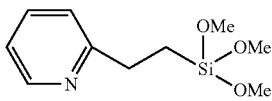 [SMILES: CO[Si](CCc1ccccn1)(OC)OC]

2-(trimethoxysilyl)pyridine with CAS number [27326-65-4]

Injected into a 10-liter reactor, kept under a nitrogen pressure of around 2 bar, containing 5.54 kg of methylcyclohexane, are 129 g of styrene and 333 g of butadiene and also 0.36 g of tetrahydrofurfuryl ether. After neutralizing the impurities in the solution to be polymerized by addition of sec-butyllithium, 3.65 mmol of sec-BuLi are added. The polymerization is carried out at 40° C.

After 71 min, the degree of conversion of the monomers reaches 91%. This degree of conversion is determined by weighing an extract dried at 110° C., under a reduced pressure of 200 mmHg. A control sample is then withdrawn from the reactor, then halted with an excess of methanol with respect to the lithium. The intrinsic viscosity ("initial" viscosity), which is measured at 25° C. at 0.1 g/dL in toluene, is 1.01 dL/g. The molecular weight $M_n$ of this control, determined by the SEC technique, is 88 000 g/mol, the $I_p$ is 1.08.

0.38 g of 2-(trimethoxysilyl)pyridine with a CAS number of [27326-65-4] in solution in 50 mL of methylcyclohexane are injected. After reacting for 2 hours at 40° C., 60 mL of a 0.18 mol.L$^{-1}$ solution of methanol in toluene are then added.

The polymer is then subjected to an antioxidizing treatment by addition of 0.32 part per hundred parts of rubbers (phr) of 4,4'-methylenebis(2,6-tert-butylphenol) and 0.08 part per hundred parts of rubbers (phr) of N-(1,3-dimethylbutyl)-N-phenyl-p-phenylene-diamine. The copolymer thus prepared is dried under reduced pressure at 60° C.

The "final" intrinsic viscosity measured is 1.65 dL/g. The ML viscosity of the polymer thus coupled is 56. The jump in viscosity, defined as the ratio of said "final" viscosity to said "initial" viscosity, is 1.6 in this instance.

The molecular weight $M_n$ of this copolymer, determined by the SEC technique, is 150 000 g/mol and the $I_p$ is 1.24. The weight percentage of uncoupled linear chains is around 20%.

The microstructure of this copolymer is determined by the NIR method:

The weight content of trans-1,4-units is 21%, that of cis-1,4-units is 19% and that of 1,2-units is 60% (each of these three contents relates to the butadiene units).

The weight content of styrene is 25%.

Comparative Examples of Rubber Compositions

A) Measurements and Tests Used (a) The Mooney viscosity ML (large) and MS (small) (1+4) at 100° C.: measured according to the ASTM: D-1646 standard, entitled "Mooney" in the tables.

(b) The SHORE A hardness: measurements carried out according to the DIN 53505 standard.

(c) The elongation moduli at 300% (EM 300), at 100% (EM 100) and at 10% (EM 10): measurements carried out according to the ISO 37 standard.

(d) The Scott fracture index at 23° C.: the tensile strength (Ts) in MPa and the elongation at break (Eb) in % are determined. All these tensile measurements are carried out under the normal temperature and hygrometry conditions according to the ISO 37 standard.

(e) The loss at 60° C.: an energy loss at 60° C. by rebound at a set energy measured at the sixth impact. The value, expressed in %, is the difference between the energy supplied and the energy restored, relative to the energy supplied.

(f) The dynamic properties $\Delta G^*$ and $\tan(\delta)_{max}$, are measured on a viscoanalyzer (Metravib VA4000) according to the ASTM D 5992-96 standard. The response of a sample of vulcanized composition (cylindrical test piece with a thickness of 2 mm and a cross section of 79 mm$^2$), subjected to a sinusoidal stress in simple alternating shear, at a frequency of 10 Hz, under normal temperature conditions (23° C.) according to the ASTM D 1349-99 standard is recorded. A scan with a peak-to-peak strain amplitude ranging from 0.1% to 50% (forward cycle) then from 50% to 0.1% (return cycle) is carried out. The results gathered are the complex dynamic shear modulus (G*) and the loss factor tan δ. For the return cycle, the maximum value of tan δ observed ($\tan(\delta)_{max}$), and also the difference in the complex modulus ($\Delta G^*$) between the values at 0.1% and 50% strain (the Payne effect) are indicated.

B) The Examples

EXAMPLE 1

Compositions Comprising Either an Elastomer Having an Amine Alkoxysilane Functional Group in the Middle of the Chain According to the Invention or an Elastomer not in Accordance with the Invention
($T_g$=-25° C.)

In this example, the three elastomers SBR A, SBR C and SBR D were used for the preparation of rubber compositions A, C and D, each comprising carbon black as reinforcing filler.

Each of these compositions A, C, and D has the following formulation (expressed in phr: parts per one hundred parts of rubber):

| | |
|---|---|
| Elastomer | 100 |
| N234 | 50 |
| Antioxidant (1) | 1 |
| Stearic acid | 2 |
| ZnO | 3 |
| Sulphenamide (2) | 1.2 |
| Sulphur | 1.2 |

(1) = N-(1,3-dimethylbutyl)-N'-phenyl-p-phenylenediamine
(2) = N-cyclohexyl-2-benzothiazylsulphenamide Each of the following compositions is prepared, in a first step, by thermomechanical working, then, in a second finishing step, by mechanical working.

The elastomer, the reinforcing filler, the antioxidant, the stearic acid and the zinc monooxide are successively introduced into a laboratory internal mixer of "Banbury" type, the capacity of which is 400 cm$^3$, which is 70% filled and which has a starting temperature of approximately 70° C.

The stage of thermomechanical working is carried out for 4 to 5 minutes up to a maximum dropping temperature of approximately 170° C.

The first abovementioned step of thermomechanical working is thus carried out, it being specified that the mean speed of the blades during this first step is 60 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tyres, in particular for treads.

Crosslinking is carried out at 150° C. for 40 min.

The results are recorded in Table 1 below.

TABLE 1

| Elastomer | A | C | D |
|---|---|---|---|
| composition | SBR A | SBR C | SBR D |
| ML 1 + 4 at 100° C. (elastomer) | 53 | 53 | 54 |
| Properties in the uncrosslinked state: | | | |
| MS 1 + 4 at 100° C. ("Mooney mixture") | 72 | 61 | 76 |
| Properties in the crosslinked state: | | | |
| Shore A | 73 | 70 | 71 |
| EM10 | 7.63 | 6.37 | 6.92 |
| EM100 | 2.61 | 2.18 | 2.54 |
| EM300 | 2.92 | 2.59 | 3.10 |
| EM300/EM100 | 1.12 | 1.19 | 1.22 |
| Scott fracture index at 23° C. | | | |
| Ts (MPa) | 20 | 19 | 21 |
| Eb (%) | 401 | 430 | 410 |
| Losses 60° C. (%) | 40 | 42 | 37 |
| Dynamic properties as a function of the strain | | | |
| Delta G* (MPa) at 23° C. | 5.66 | 3.60 | 5.32 |
| Tan($\delta$)$_{max}$ at 23° C. | 0.382 | 0.344 | 0.367 |

It should be noted that composition C according to the invention has a Mooney "mixture" value which is lower than that of composition A based on a non-functional elastomer and very substantially lower than that of composition D based on an elastomer which comprises an amine alkoxysilane functional group at the chain end. The elastomer C which comprises an amine alkoxysilane functional group in the middle of the chain according to the invention makes it possible to very substantially improve the processing in the uncrosslinked state with respect to the elastomer with an amine alkoxysilane functional group at the chain end on one hand, and makes it possible to improve the processing in the uncrosslinked state with respect to the non-functional elastomer on the other hand.

As regards the properties in the crosslinked state, it should be noted that the EM300/EM100 ratio of composition C according to the invention is higher than that of composition A based on a non-functional elastomer. The elastomer C which comprises an amine alkoxysilane functional group in the middle of the chain according to the invention makes it possible to improve the reinforcement with respect to the non-functional elastomer.

As regards the dynamic properties, it should be noted that the values of Delta G* and of tan $\delta_{max}$ of composition C according to the invention are lower than those of composition D based on an elastomer which comprises an amine alkoxysilane functional group at the chain end. The elastomer C which bears an amine alkoxysilane functional group in the middle of the chain according to the invention makes it possible to improve the hysteresis properties with respect to the elastomer D which comprises an amine alkoxysilane functional group at the chain end.

As regards the dynamic properties, it should be noted that the values of Delta G* and of tan $\delta_{max}$ of composition C according to the invention are very substantially lower than those of composition A based on a non-functional elastomer. The elastomer C which comprises an amine alkoxysilane functional group in the middle of the chain according to the invention makes it possible to very substantially improve the hysteresis properties with respect to the non-functional elastomer.

In other words, the composition C according to the invention based on an elastomer which bears an amine alkoxysilane functional group in the middle of the chain exhibits rubbery properties in the uncrosslinked state and in the crosslinked state which are improved with respect to those of composition D based on an elastomer which comprises an amine alkoxysilane functional group at the chain end as a result of a very substantially improved processability and of a reduced hysteresis.

In other words, the composition C according to the invention based on an elastomer which comprises an amine alkoxysilane functional group in the middle of the chain exhibits rubbery properties in the uncrosslinked state and in the crosslinked state which are improved with respect to those of composition A based on a non-functional elastomer as a result of a substantially reduced hysteresis and of an improved processability.

EXAMPLE 2

Compositions Comprising Either an Elastomer Having an Amine Alkoxysilane Functional Group in the Middle of the Chain According to the Invention or an Elastomer not in Accordance with the Invention ($T_g = -48°$ C.)

In this example, the three elastomers SBR E, SBR G and SBR H were used for the preparation of rubber compositions E, G and H, each comprising carbon black as reinforcing filler.

Each of these compositions E, G, and H has the following formulation (expressed in phr: parts per one hundred parts of rubber):

| Elastomer | 100 |
|---|---|
| N234 | 50 |
| Antioxidant (1) | 1 |
| Stearic acid | 2 |
| ZnO | 3 |
| Sulphenamide (2) | 1.2 |
| Sulphur | 1.2 |

(1) = N-(1,3-dimethylbutyl)-N'-phenyl-p-phenylenediamine,
(2) = N-cyclohexyl-2-benzothiazylsulphenamide.

Each of the following compositions is prepared, in a first step, by thermomechanical working, then, in a second finishing step, by mechanical working.

The elastomer, the reinforcing filler, the antioxidant, the stearic acid and the zinc monooxide are successively introduced into a laboratory internal mixer of "Banbury" type, the capacity of which is 400 cm³, which is 70% filled and which has a starting temperature of approximately 70° C.

The stage of thermomechanical working is carried out for 4 to 5 minutes up to a maximum dropping temperature of approximately 170° C.

The first abovementioned step of thermomechanical working is thus carried out, it being specified that the mean speed of the blades during this first step is 60 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tyres, in particular for treads.

Crosslinking is carried out at 150° C. for 40 min.

The results are recorded in Table 2 below.

TABLE 2

| Elastomer | E | G | H |
|---|---|---|---|
| composition | SBR E | SBR G | SBR H |
| ML 1 + 4 at 100° C. (elastomer) | 57 | 57 | 52 |
| Properties in the uncrosslinked state: | | | |
| MS 1 + 4 at 100° C. ("Mooney mixture") | 83 | 73 | 82 |
| Properties in the crosslinked state: | | | |
| Shore A | 72 | 67 | 71 |
| EM10 | 7.20 | 5.98 | 6.67 |
| EM100 | 2.60 | 2.18 | 2.53 |
| EM300 | 3.13 | 2.82 | 3.23 |
| EM300/EM100 | 1.20 | 1.29 | 1.28 |
| Scott fracture index at 23° C. | | | |
| Ts (MPa) | 27 | 25 | 27 |
| Eb (%) | 509 | 507 | 475 |
| Losses 60° C. (%) | 33 | 33 | 31 |
| Dynamic properties as a function of the strain | | | |
| Delta G* (MPa) at 23° C. | 5.77 | 2.71 | 4.76 |
| Tan($\delta$)$_{max}$ at 23° C. | 0.280 | 0.232 | 0.272 |

It should be noted that composition G according to the invention has a Mooney "mixture" value which is substantially lower than that of composition E based on a non-functional elastomer and substantially lower than that of composition H based on an elastomer which comprises an amine alkoxysilane functional group at the chain end. The elastomer G which comprises an amine alkoxysilane functional group in the middle of the chain according to the invention makes it possible to very substantially improve the processing in the uncrosslinked state with respect to the elastomer with an amine alkoxysilane functional group at the chain end on one hand, and with respect to the non-functional elastomer on the other hand.

As regards the properties in the crosslinked state, it should be noted that the EM300/EM100 ratio of composition G according to the invention is higher than that of composition E based on a non-functional elastomer. The elastomer G which comprises an amine alkoxysilane functional group in the middle of the chain according to the invention makes it possible to improve the reinforcement with respect to the non-functional elastomer.

As regards the dynamic properties, it should be noted that the values of Delta G* and of tan $\delta_{max}$ of composition G according to the invention are lower than those of composition H based on an elastomer which comprises an amine alkoxysilane functional group at the chain end. The elastomer G which bears an amine alkoxysilane functional group in the middle of the chain according to the invention makes it possible to improve the hysteresis properties with respect to the elastomer H which comprises an amine alkoxysilane functional group at the chain end.

As regards the dynamic properties, it should be noted that the values of Delta G* and of tan $\delta_{max}$ of composition G according to the invention are very substantially lower than those of composition E based on a non-functional elastomer. The elastomer G which comprises an amine alkoxysilane functional group in the middle of the chain according to the invention makes it possible to very substantially improve the hysteresis properties with respect to the non-functional elastomer.

In other words, the composition G according to the invention based on an elastomer which bears an amine alkoxysilane functional group in the middle of the chain exhibits rubbery properties in the uncrosslinked state and in the crosslinked state which are improved with respect to those of composition H based on an elastomer which comprises an amine alkoxysilane functional group at the chain end as a result of a substantially improved processability and of a reduced hysteresis.

In other words, the composition G according to the invention based on an elastomer which comprises an amine alkoxysilane functional group in the middle of the chain exhibits rubbery properties in the uncrosslinked state and in the crosslinked state which are improved with respect to those of composition E based on a non-functional elastomer as a result of a substantially reduced hysteresis and of an improved processability.

EXAMPLE 3

Compositions Comprising Either an Elastomer Having an Amine Alkoxysilane Functional Group in the Middle of the Chain According to the Invention or an Elastomer not in Accordance with the Invention ($T_g$=−25° C.)

In this example, the three elastomers SBR A, SBR B and SBR C were used for the preparation of rubber compositions A, B and C, each comprising carbon black and silica as reinforcing filler.

Each of these compositions A, B and C has the following formulation (expressed in phr: parts per one hundred parts of rubber):

| Elastomer | 100 |
|---|---|
| N234 | 35 |
| Silica (1) | 35 |
| Oil (2) | 24.5 |
| X50S (3) | 5.6 |
| Diphenylguanidine | 0.7 |
| Antioxidant (4) | 1.9 |
| C32ST antiozone wax | 1.5 |
| Stearic acid | 2 |
| ZnO | 3 |
| Sulphenamide (5) | 1.3 |
| Sulphur | 1.3 |

(1) = Zeosil 1165 MP silica from Rhodia
(2) = Tufflo 2000 oil
(3) = Degussa
(4) = N-(1,3-dimethylbutyl)-N'-phenyl-p-phenylenediamine
(5) = N-cyclohexyl-2-benzothiazylsulphenamide Each of the following compositions is prepared, in a first step, by thermomechanical working, then, in a second finishing step, by mechanical working.

The elastomer, the silica, the oil, the diphenylguanidine, the silane on black, the antioxidant, the stearic acid and the wax then, around 40 seconds later, the carbon black, then, around three minutes later or at 150° C., the zinc monooxide are successively introduced into a laboratory internal mixer of "Banbury" type, the capacity of which is 400 cm³, which is 75% filled and which has a starting temperature of approximately 70° C.

The stage of thermomechanical working is carried out for 5 to 6 minutes up to a maximum dropping temperature of approximately 160° C.

The first abovementioned step of thermomechanical working is thus carried out, it being specified that the mean speed of the blades during this first step is 70 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tyres, in particular for treads.

Crosslinking is carried out at 150° C. for 70 min.

The results are recorded in Table 3 below.

TABLE 3

| Elastomer | A | B | C |
|---|---|---|---|
| composition | SBR A | SBR B | SBR C |
| ML 1 + 4 at 100° C. (elastomer) | 53 | 55 | 53 |
| Properties in the uncrosslinked state: | | | |
| MS 1 + 4 at 100° C. ("Mooney mixture") | 42 | 55 | 42 |
| Properties in the crosslinked state: | | | |
| Shore A | 70.6 | 65.5 | 64.9 |
| EM10 | 6.30 | 4.80 | 5.28 |
| EM100 | 2.40 | 2.27 | 2.47 |
| EM300 | 2.59 | 2.83 | 2.84 |
| EM300/EM100 | 1.08 | 1.25 | 1.15 |
| Scott fracture index at 23° C. | | | |
| Ts (MPa) | 17 | 19 | 18 |
| Eb (%) | 420 | 421 | 401 |
| Losses 60° C. (%) | 38 | 29 | 33 |
| Dynamic properties as a function of the strain | | | |
| Delta G* (MPa) at 23° C. | 7.50 | 3.82 | 2.91 |
| Tan($\delta$)$_{max}$ at 23° C. | 0.421 | 0.358 | 0.334 |

It should be noted that composition C according to the invention has a Mooney "mixture" value which is equivalent to that of composition A based on a non-functional elastomer and very substantially lower than that of composition B based on an elastomer which comprises an SiOH functional group at the chain end. The elastomer C which comprises an amine alkoxysilane functional group in the middle of the chain according to the invention makes it possible to very substantially improve the processing in the uncrosslinked state with respect to the elastomer with an SiOH functional group at the chain end on one hand, and exhibits an equivalent processing in the uncrosslinked state with respect to the non-functional elastomer on the other hand.

As regards the properties in the crosslinked state, it should be noted that the EM300/EM100 ratio of composition C according to the invention is higher than that of composition A based on a non-functional elastomer. The elastomer C which comprises an amine alkoxysilane functional group in the middle of the chain according to the invention makes it possible to improve the reinforcement with respect to the non-functional elastomer.

As regards the dynamic properties, it should be noted that the values of Delta G* and of tan $\delta_{max}$ of composition C according to the invention are lower than those of composition B based on an elastomer which comprises an SiOH functional group at the chain end. The elastomer C which bears an amine alkoxysilane functional group in the middle of the chain according to the invention makes it possible to improve the hysteresis properties with respect to the elastomer B which comprises an SiOH functional group at the chain end.

As regards the dynamic properties, it should be noted that the values of Delta G* and of tan $\delta_{max}$ of composition C according to the invention are very substantially lower than those of composition A based on a non-functional elastomer. The elastomer C which comprises an amine alkoxysilane functional group in the middle of the chain according to the invention makes it possible to very substantially improve the hysteresis properties with respect to the non-functional elastomer.

In other words, the composition C according to the invention based on an elastomer which bears an amine alkoxysilane functional group in the middle of the chain exhibits rubbery properties in the uncrosslinked state and in the crosslinked state which are improved with respect to those of composition B based on an elastomer which comprises an SiOH functional group at the chain end as a result of a substantially improved processability and of a reduced hysteresis.

In other words, the composition C according to the invention based on an elastomer which comprises an amine alkoxysilane functional group in the middle of the chain exhibits rubbery properties in the uncrosslinked state and in the crosslinked state which are improved with respect to those of composition A based on a non-functional elastomer as a result of a substantially reduced hysteresis at equivalent processing.

EXAMPLE 4

Compositions Comprising Either an Elastomer Having an Amine Alkoxysilane Functional Group in the Middle of the Chain According to the Invention or an Elastomer not in Accordance with the Invention ($T_g$=−48° C.)

In this example, the three elastomers SBR E, SBR F and SBR G were used for the preparation of rubber compositions E, F and G, each comprising carbon black and silica as reinforcing filler.

Each of these compositions E, F and G has the following formulation (expressed in phr: parts per one hundred parts of rubber):

| Elastomer | 100 |
|---|---|
| N234 | 35 |
| Silica (1) | 35 |
| Oil (2) | 24.5 |
| X50S (3) | 5.6 |
| Diphenylguanidine | 0.7 |
| Antioxidant (4) | 1.9 |
| C32ST antiozone wax | 1.5 |

-continued

| | |
|---|---|
| Stearic acid | 2 |
| ZnO | 3 |
| Sulphenamide (5) | 1.3 |
| Sulphur | 1.3 |

(1) = Zeosil 1165 MP silica from Rhodia
(2) = Tufflo 2000 oil
(3) = Degussa
(4) = N-(1,3-dimethylbutyl)-N'-phenyl-p-phenylenediamine
(5) = N-cyclohexyl-2-benzothiazylsulphenamide Each of the following compositions is prepared, in a first step, by thermomechanical working, then, in a second finishing step, by mechanical working.

The elastomer, the silica, the oil, the diphenylguanidine, the silane on black, the antioxidant, the stearic acid and the wax then, around 40 seconds later, the black, then, around three minutes later or at 150° C., the zinc monooxide are successively introduced into a laboratory internal mixer of "Banbury" type, the capacity of which is 400 cm$^3$, which is 75% filled and which has a starting temperature of approximately 70° C.

The stage of thermomechanical working is carried out for 5 to 6 minutes up to a maximum dropping temperature of approximately 160° C.

The first abovementioned step of thermomechanical working is thus carried out, it being specified that the mean speed of the blades during this first step is 70 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tyres, in particular for treads.

Crosslinking is carried out at 150° C. for 50 min.

The results are recorded in Table 4 below.

TABLE 4

| Elastomer | E | F | G |
|---|---|---|---|
| composition | SBR E | SBR F | SBR G |
| ML 1 + 4 at 100° C. (elastomer) | 57 | 57 | 57 |
| Properties in the uncrosslinked state: | | | |
| MS 1 + 4 at 100° C. ("Mooney mixture") | 49 | 74 | 54 |
| Properties in the crosslinked state: | | | |
| Shore A | 69.2 | 63.9 | 63.9 |
| EM10 | 6.87 | 5.06 | 5.15 |
| EM100 | 2.15 | 2.11 | 2.17 |
| EM300 | 2.17 | 2.55 | 2.45 |
| EM300/EM100 | 1.01 | 1.21 | 1.13 |
| Scott fracture index at 23° C. | | | |
| Ts (MPa) | 21.6 | 22.3 | 20.4 |
| Eb (%) | 589 | 504 | 491 |
| Losses 60° C. (%) | 35.9 | 25.4 | 31.1 |
| Dynamic properties as a function of the strain | | | |
| Delta G* (MPa) at 23° C. | 7.33 | 3.21 | 2.54 |
| Tan (δ) max at 23° C. | 0.339 | 0.261 | 0.249 |

It should be noted that composition G according to the invention has a Mooney "mixture" value which is substantially lower than that of composition F based on an elastomer which comprises an SiOH functional group at the chain end.

As regards the properties in the crosslinked state, it should be noted that the EM300/EM100 ratio of composition G according to the invention is higher than that of composition E based on a non-functional elastomer. The elastomer G which comprises an amine alkoxysilane functional group in the middle of the chain according to the invention makes it possible to improve the reinforcement with respect to the non-functional elastomer.

As regards the dynamic properties, it should be noted that the values of Delta G* and of tan $\delta_{max}$ of composition G according to the invention are lower than those of composition F based on an elastomer which comprises an SiOH functional group at the chain end. The elastomer G which bears an amine alkoxysilane functional group in the middle of the chain according to the invention makes it possible to improve the hysteresis properties with respect to the elastomer F which comprises an SiOH functional group at the chain end.

As regards the dynamic properties, it should be noted that the values of Delta G* and of tan $\delta_{max}$ of composition G according to the invention are very substantially lower than those of composition E based on a non-functional elastomer. The elastomer G which comprises an amine alkoxysilane functional group in the middle of the chain according to the invention makes it possible to very substantially improve the hysteresis properties with respect to the non-functional elastomer.

In other words, the composition G according to the invention based on an elastomer which bears an amine alkoxysilane functional group in the middle of the chain exhibits rubbery properties in the uncrosslinked state and in the crosslinked state which are improved with respect to those of composition F based on an elastomer which comprises an SiOH functional group at the chain end as a result of a substantially improved processability and of a reduced hysteresis.

In other words, the composition G according to the invention based on an elastomer which comprises an amine alkoxysilane functional group in the middle of the chain exhibits rubbery properties in the crosslinked state which are improved with respect to those of composition E based on a non-functional elastomer as a result of a substantially reduced hysteresis.

EXAMPLE 5

Compositions Comprising Either an Elastomer Having an Amine Alkoxysilane Functional Group in the Middle of the Chain According to the Invention or an Elastomer not in Accordance with the Invention ($T_g$=−25° C.)

In this series of examples, the elastomers SBR A, SBR B, SBR C, SBR D, SBR I, SBR J, SBR K and SBR L were used for the preparation of rubber compositions A, B, C, D, I, J, K and L of tread type, each comprising silica as reinforcing filler, Each of these compositions A, B, C, D, I, J, K and L has the following formulation (expressed in phr: parts per one hundred parts of rubber):

| | |
|---|---|
| Elastomer | 100 |
| Silica (1) | 80 |
| N234 | 1 |
| MES oil (5) | 15 |
| Resin (6) | 15 |
| Bonding agent (2) | 6.4 |
| ZnO | 2.5 |
| Stearic acid | 2 |
| Antioxidant (3) | 1.9 |
| C32ST antiozone wax (7) | 1.5 |
| Diphenylguanidine | 1.5 |
| Sulphur | 1.2 |
| Sulphenamide (4) | 2 | with:
(1) = Zeosil 1165 MP silica from Rhodia
(2) = Si69 bonding agent from Degussa
(3) = N-(1,3-dimethylbutyl)-N'-phenyl-p-phenylenediamine
(4) = N-cyclohexyl-2-benzothiazylsulphenamide
(5) = Catenex ® SNR from Shell
(6) = Dercolyte L120 resin from DRT or Sylvagum TR7125C resin from the company Arizona
(7) = antiozone wax from Repsol Each of the following compositions is prepared, in a first step, by thermomechanical working, then, in a second finishing step, by mechanical working.

The elastomer, two thirds of the reinforcing filler, the coupling agent and the diphenylguanidine, then, approximately one minute later, the remainder of the reinforcing filler, the MES oil, the resin, the antioxidant, the stearic acid and the C32ST antiozone wax, then, approximately two minutes later, the zinc monooxide are successively introduced into a laboratory internal mixer of "Banbury" type, the capacity of which is 400 cm$^3$, which is 70% filled and which has a starting temperature of approximately 90° C.

The stage of thermomechanical working is carried out for 4 to 5 minutes up to a maximum dropping temperature of approximately 160° C.

The first abovementioned step of thermomechanical working is thus carried out, it being specified that the mean speed of the blades during this first step is 45 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tyres, in particular for treads.

Crosslinking is carried out at 150° C. for 40 min.

The results are recorded in Table 5 below.

TABLE 5

| Elastomer | A | B | C | D | I | J | K | L |
|---|---|---|---|---|---|---|---|---|
| composition | SBR A | SBR B | SBR C | SBR D | SBR I | SBR J | SBR K | SBR L |
| ML (1 + 4) at 100° C. (elastomer) | 53 | 55 | 53 | 54 | 50 | 50 | 52 | 56 |
| Properties in the uncrosslinked state | | | | | | | | |
| ML (1 + 4) at 100° C. ("Mooney mixture") | 81 | 99 | 67 | 103 | 66 | 68 | 71 | 64 |
| Properties in the crosslinked state | | | | | | | | |
| Shore A | 70.9 | 66.2 | 63.6 | 65.8 | 64.9 | 62.8 | 61.0 | 62.6 |
| EM 10 | 6.85 | 4.91 | 4.31 | 4.82 | 4.94 | 4.29 | 3.90 | 4.13 |
| EM 100 | 2.48 | 2.46 | 2.47 | 2.65 | 2.62 | 2.50 | 2.22 | 2.38 |
| EM 300 | 2.60 | 3.01 | 2.86 | 3.13 | 2.94 | 3.07 | 3.09 | 2.85 |
| EM 300/EM 100 | 1.05 | 1.22 | 1.16 | 1.18 | 1.12 | 1.23 | 1.40 | 1.20 |
| Scott fracture index at 23° C. | | | | | | | | |
| Ts (MPa) | 16.7 | 18.0 | 15.5 | 18.9 | 16.3 | 15.2 | 15.7 | 14.9 |
| Eb (%) | 400 | 363 | 333 | 366 | 345 | 320 | 317 | 334 |
| Losses 60° C. (%) | 33.9 | 23.6 | 25.7 | 20.4 | 27.1 | 24.1 | 23.2 | 26.5 |
| Dynamic properties as a function of the strain | | | | | | | | |
| Delta G * (MPa) at 23° C. | 6.60 | 2.54 | 0.95 | 1.97 | 1.17 | 0.87 | 1.64 | 0.91 |
| Tan(δ)$_{max}$ at 23° C. | 0.496 | 0.411 | 0.333 | 0.365 | 0.357 | 0.281 | 0.353 | 0.314 |

It should be noted that compositions C, I, J, K and L according to the invention have Mooney "mixture" values which are lower than that of composition A based on a non-functional elastomer. Compositions C, I, J, K and L according to the invention have Mooney "mixture" values which are very substantially lower than that of composition B based on an elastomer which comprises an SiOH functional group at the chain end and that of composition D based on an elastomer which comprises an amine alkoxysilane functional group at the chain end. The elastomers C, I, J, K and L which comprise an amine alkoxysilane functional group in the middle of the chain according to the invention make it possible to very substantially improve the processability in the uncrosslinked state with respect to the chain-end SiOH functional elastomer and to the chain-end amine alkoxysilane functional elastomer on the one hand, and make it possible to substantially improve the processability in the uncrosslinked state with respect to the non-functional elastomer on the other hand.

As regards the properties in the crosslinked state, it should be noted that the EM300/EM100 ratio of compositions C, I, J, K and L according to the invention are substantially higher than that of composition A based on a non-functional elastomer. The elastomers C, I, J, K and L which comprise an amine alkoxysilane functional group in the middle of the chain according to the invention make it possible to improve the reinforcement with respect to the non-functional elastomer.

The EM300/EM100 ratio of compositions C, I, J and L according to the invention are equivalent to, or even higher than for the composition K, that of compositions B and D based respectively on a chain-end SiOH functional elastomer and on a chain-end amine alkoxysilane functional elastomer. The elastomers C, I, J, K and L which comprise an amine alkoxysilane functional group in the middle of the chain according to the invention make it possible to at least retain a level of reinforcement equivalent to that of the chain-end SiOH functional and chain-end amine alkoxysilane functional elastomers, or even to improve it.

As regards the dynamic properties, it should be noted that the values of Delta G* and of tan $\delta_{max}$ of compositions C, I, J, K and L according to the invention are very substantially lower than those of composition A based on a non-functional elastomer. The elastomers C, I, J, K and L which comprise an amine alkoxysilane functional group in the middle of the chain according to the invention make it possible to improve the hysteresis properties with respect to the non-functional elastomer A.

As regards the dynamic properties, it should be noted that the values of Delta G* and of tan $\delta_{max}$ of compositions C, I, J, K and L according to the invention are lower than those of compositions B and D based respectively on a chain-end SiOH functional elastomer and on a chain-end amine alkoxysilane functional elastomer. The elastomers C, I, J, K and L which comprise an amine alkoxysilane functional group in the middle of the chain according to the invention make it possible to improve the hysteresis properties with respect to the elastomer B which comprises an SiOH functional group at the chain end on the one hand, and with respect to the elastomer D which comprises an amine alkoxysilane functional group at the chain end on the other hand.

In other words, the compositions C, I, J, K and L according to the invention based on elastomers which comprise an amine alkoxysilane functional group in the middle of the chain exhibit rubbery properties in the uncrosslinked state and in the crosslinked state which are improved with respect to those of composition A based on a non-functional elastomer as a result of a substantially reduced hysteresis and of an improved processability.

In other words, the compositions C, I, J, K and L according to the invention based on elastomers which comprise an amine alkoxysilane functional group in the middle of the chain exhibit rubbery properties in the uncrosslinked state and in the crosslinked state which are improved with respect to those of compositions B and D based respectively on a chain-end SiOH functional elastomer and on a chain-end amine alkoxysilane functional elastomer as a result of a very substantially improved processability and of a substantially reduced hysteresis.

EXAMPLE 6

Compositions Comprising Either an Elastomer Having an Amine Alkoxysilane Functional Group (Dimethylaminopropyltrimethoxysilane) in the Middle of the Chain According to the Invention or an Elastomer not in Accordance with the Invention
($T_g$=48° C.)

In this example, the four elastomers SBR E, SBR F, SBR G and SBR H were used for the preparation of rubber compositions E, F, G and H of tread type, each comprising silica as reinforcing filler.

Each of these compositions E, F, G and H has the following formulation (expressed to in phr: parts per one hundred parts of rubber):

| | |
|---|---|
| Elastomer | 100 |
| Silica (1) | 50 |
| N234 | 1 |
| Bonding agent (2) | 4 |
| ZnO | 3 |
| Stearic acid | 1.9 |
| Antioxidant (3) | 1.9 |
| Diphenylguanidine | 1 |
| Sulphur | 1.5 |
| Sulphenamide (4) | 1.8 | with:
(1) = Zeosil 1165 MP silica from Rhodia
(2) = Si69 bonding agent from Degussa
(3) = N-(1,3-dimethylbutyl)-N'-phenyl-p-phenylenediamine
(4) = N-cyclohexyl-2-benzothiazylsulphenamide Each of the following compositions is prepared, in a first step, by thermomechanical working, then, in a second finishing step, by mechanical working.

The elastomer, the reinforcing filler, the coupling agent and the diphenylguanidine, then, approximately one minute later, the antioxidant, the stearic acid and the zinc monooxide are successively introduced into a laboratory internal mixer of "Banbury" type, the capacity of which is 400 cm³, which is 70% filled and which has a starting temperature of approximately 90° C.

The stage of thermomechanical working is carried out for 4 to 5 minutes up to a maximum dropping temperature of approximately 160° C.

The first abovementioned step of thermomechanical working is thus carried out, it being specified that the mean speed of the blades during this first step is 45 rpm.

The mixture thus obtained is recovered and cooled and then, in an external mixer (homofinisher), the sulphur and the sulphenamide are added at 30° C., the combined mixture being further mixed for a time of 3 to 4 minutes (second abovementioned step of mechanical working).

The compositions thus obtained are subsequently calendered, either in the form of sheets (with a thickness ranging from 2 to 3 mm) or fine sheets of rubber, for the measurement of their physical or mechanical properties, or in the form of profiled elements which can be used directly, after cutting and/or assembly to the desired dimensions, for example as semi-finished products for tyres, in particular for treads.

Crosslinking is carried out at 150° C. for 40 min.

The results are recorded in Table 6 below.

TABLE 6

| Elastomer | E | F | G | H |
|---|---|---|---|---|
| composition | SBR E | SBR F | SBR G | SBR H |
| ML (1 + 4) at 100° C. (elastomer) | 57 | 57 | 57 | 52 |
| Properties in the uncrosslinked state | | | | |
| MS (1 + 4) at 100° C. ("Mooney mixture") | 66 | 96 | 67 | 87 |
| Properties in the crosslinked state | | | | |
| Shore A | 74.5 | 67.3 | 65.3 | 69.0 |
| EM10 | 8.32 | 5.84 | 5.25 | 6.35 |
| EM100 | 3.00 | 2.63 | 2.63 | 2.90 |
| EM300 | 2.73 | 3.72 | 3.58 | 3.84 |
| EM300/EM100 | 0.91 | 1.41 | 1.36 | 1.32 |
| Scott fracture index at 23° C. | | | | |
| Ts (MPa) | 14.7 | 17.8 | 17.3 | 21.5 |
| Eb (%) | 304 | 322 | 318 | 358 |
| Losses 60° C. (%) | 23.0 | 13.2 | 14.5 | 13.1 |
| Dynamic properties as a function of the strain | | | | |
| Delta G* (MPa) at 23° C. | 4.15 | 1.01 | 0.36 | 0.97 |
| Tan($\delta$)$_{max}$ at 23° C. | 0.210 | 0.124 | 0.106 | 0.122 |

It should be noted that composition G according to the invention has a Mooney "mixture" value which is equivalent to that of the composition E based on a non-functional elastomer. Composition G according to the invention has a Mooney "mixture" value which is very substantially lower than that of composition F based on an elastomer which comprises an SiOH functional group at the chain end and than that of composition H based on an elastomer which comprises an amine alkoxysilane functional group at the chain end. The elastomer G which comprises an amine alkoxysilane functional group in the middle of the chain according to the invention makes it possible to very substantially improve the processability in the uncrosslinked state with respect to the chain-end SiOH functional elastomer and to the chain-end amine alkoxysilane functional elastomer.

As regards the properties in the crosslinked state, it should be noted that the EM300/EM100 ratio of composition G according to the invention is substantially higher than that of composition E based on a non-functional elastomer. The elastomer G which comprises an amine alkoxysilane functional group in the middle of the chain according to the invention makes it possible to improve the reinforcement with respect to the non-functional elastomer.

The EM300/EM100 ratio of composition G according to the invention is equivalent to that of compositions F and H based respectively on a chain-end SiOH functional elastomer and on a chain-end amine alkoxysilane functional elastomer. The elastomer G which comprises an amine alkoxysilane functional group in the middle of the chain according to the invention makes it possible to retain a level of reinforcement equivalent to that of the chain-end SiOH functional and chain-end amine alkoxysilane functional elastomers.

As regards the dynamic properties, it should be noted that the values of Delta G* and of tan $\delta_{max}$ of composition G according to the invention are very substantially lower than those of composition E based on a non-functional elastomer. The elastomer G which comprises an amine alkoxysilane functional group in the middle of the chain according to the invention makes it possible to improve the hysteresis properties with respect to the non-functional elastomer E.

As regards the dynamic properties, it should be noted that the values of Delta G* and of tan $\delta_{max}$ of composition G according to the invention are lower than those of compositions F and H based respectively on a chain-end SiOH functional elastomer and on a chain-end amine alkoxysilane functional elastomer. The elastomer G which comprises an amine alkoxysilane functional group in the middle of the chain according to the invention makes it possible to improve the hysteresis properties with respect to the elastomer F which comprises an SiOH functional group at the chain end on the one hand, and with respect to the elastomer H which comprises an amine alkoxysilane functional group at the chain end on the other hand.

In other words, the composition G according to the invention based on an elastomer which comprises an amine alkoxysilane functional group in the middle of the chain exhibits rubbery properties in the uncrosslinked state and in the crosslinked state which are improved with respect to those of composition E based on a non-functional elastomer as a result of a substantially reduced hysteresis and of a retained processability.

In other words, the composition G according to the invention based on an elastomer which comprises an amine alkoxysilane functional group in the middle of the chain exhibits rubbery properties in the uncrosslinked state and in the crosslinked state which are improved with respect to those of compositions F and H based respectively on a chain-end SiOH functional elastomer and on a chain-end amine alkoxysilane functional elastomer as a result of a very substantially improved processability and of a reduced hysteresis.

The invention claimed is:

1. An elastomer mixture resulting from the modification of a diene elastomer by a coupling agent that introduces, into the elastomer chain, an alkoxysilane group bearing a tertiary or secondary amine functional group, wherein the elastomer mixture predominantly comprises the diene elastomer having the alkoxysilane group bearing a tertiary or secondary amine functional group within its polymer chain, the silicon atom of this aminoalkoxysilane group bonding two chains of the diene elastomer.

2. The elastomer mixture according to claim 1, wherein the diene elastomer coupled by the alkoxysilane group bearing a tertiary or secondary amine functional group, bonded to the diene elastomer through the silicon atom corresponds to one of the formulae (I) to (III) below:

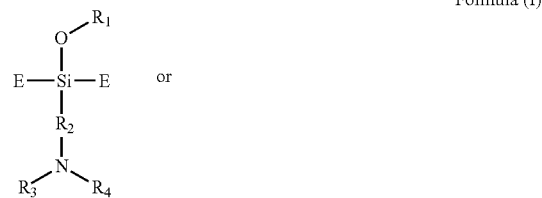

Formula (I)

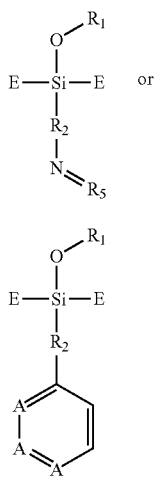

Formula (II)

Formula (III)

wherein:
the symbol E denotes a diene elastomer;
$R_1$ denotes a linear or branched, $C_1$-$C_{10}$ alkyl radical, a $C_5$-$C_{18}$ cycloalkyl radical, a $C_6$-$C_{18}$ aryl radical or a $C_7$-$C_{18}$ aralkyl radical;
$R_2$ is a linear or branched, divalent, hydrocarbon-based $C_1$-$C_{10}$ alkyl, $C_6$-$C_{18}$ aryl or $C_7$-$C_{18}$ aralkyl derivative;
in formula (I), $R_3$ and $R_4$, which are identical or different, represent a hydrogen atom or a $C_1$-$C_{10}$ alkyl radical, on condition that when one of $R_3$ and $R_4$ represents a hydrogen atom the other is different, or else $R_3$ and $R_4$ form, with N to which they are bonded, a heterocycle containing a nitrogen atom and at least one carbon atom;
in formula (II), $R_5$ represents a linear or branched, $C_1$-$C_{10}$ alkylidene radical;
in formula (III), the symbols A denote, independently of one another, a nitrogen atom or a carbon atom, on condition that at least one of the symbols A denotes a nitrogen atom.

3. The elastomer mixture according to claim 2, wherein, in the formulae (I), (II) and (III), $R_1$ represents a methyl or ethyl radical.

4. The elastomer mixture according to claim 2, wherein, in the formulae (I), (II) and (III), $R_2$ represents the propane-1,3-diyl radical.

5. The elastomer mixture according claim 2, wherein the diene elastomer coupled by the alkoxysilane group bearing a tertiary or secondary amine functional group, bonded to the diene elastomer by the silicon atom corresponds to the formula (I) in which $R_3$ and $R_4$, which are identical or different, represent a methyl or ethyl radical.

6. The elastomer mixture according to claim 2, wherein the diene elastomer coupled by the alkoxysilane group bearing a tertiary or secondary amine functional group, bonded to the diene elastomer by the silicon atom corresponds to the formula (II) in which $R_5$ represents a linear or branched, $C_4$-$C_6$ alkylidene radical.

7. The elastomer mixture according to claim 6, wherein the diene elastomer coupled by the alkoxysilane group bearing a tertiary or secondary amine functional group, bonded to the diene elastomer by the silicon atom corresponds to the formula (II) in which $R_5$ represents the 3-(1,3-dimethylbutylidene) radical.

8. The elastomer mixture according to claim 2, wherein the diene elastomer coupled by the alkoxysilane group bearing a tertiary or secondary amine functional group, bonded to the diene elastomer by the silicon atom corresponds to the formula (III) in which a single A denotes a nitrogen atom and is located in the meta or para position of the ring relative to the alkoxysilane group.

9. The elastomer mixture according to claim 1, wherein the modified diene elastomer is derived from a butadiene/vinyl aromatic copolymer prepared in solution.

10. The elastomer mixture according to claim 1, comprising at least 75% by weight of diene elastomer coupled by the aminoalkoxysilane group, relative to the total weight of the mixture.

11. A process for preparing an elastomer mixture as defined in claim 1, comprising:
(i) in a first stage, reacting one or more monomers for forming a diene polymer optionally in the presence or absence of an inert hydrocarbon solvent, with a polymerization initiator to produce a living diene polymer, and
(ii) in a second stage, reacting the living diene polymer obtained with a coupling agent that introduces, into the elastomer chain, an alkoxysilane group bearing a tertiary or secondary amine functional group, with a molar ratio of coupling agent/initiator ranging from 0.4 to 0.6.

12. A reinforced rubber composition based on at least one reinforcing filler and an elastomer matrix comprising at least one elastomer mixture as defined in claim 1.

13. The rubber composition according to claim 12, wherein the elastomer matrix predominantly comprises the elastomer mixture.

14. The rubber composition according to claim 13, wherein the elastomer matrix is constituted of the elastomer.

15. The rubber composition according to claim 12, wherein said reinforcing filler comprises a reinforcing organic filler in a weight fraction ranging from 50% to 100% of the rubber composition.

16. The rubber composition according to claim 15, wherein the reinforcing organic filler is carbon black.

17. The rubber composition according to claim 12, wherein said reinforcing filler comprises a reinforcing inorganic filler in a weight fraction greater than 50% and ranging up to 100%.

18. The rubber composition according to claim 17, wherein the reinforcing inorganic filler is silica.

19. A process for preparing a composition according to claim 12, comprising:
(i) in a first stage, preparing an elastomer mixture by reacting one or more monomers for forming a diene polymer, optionally in the presence or absence of an inert hydrocarbon solvent, with a polymerization initiator to produce a living diene polymer, and reacting, in a second stage, the living diene polymer obtained from the first stage with a coupling agent with a molar ratio of coupling agent/initiator ranging from 0.4 to 0.6, thereby obtaining predominantly a diene elastomer coupled by an alkoxysilane group bearing a tertiary or secondary amine functional group which is bonded to the diene elastomer by the silicon atom,
(ii) carrying out, at a maximum temperature of between 130° C. and 200° C., a first step of thermomechanical working of the constituents of the composition comprising the coupled diene elastomer having an alkoxysilane group bearing a tertiary or secondary amine functional group in the middle of the chain and a reinforcing filler, in the absence of a crosslinking system, then
(iii) carrying out, at a temperature below said maximum temperature of said first step, a second step of mechanical working during which said crosslinking system is incorporated.

20. A tire tread, comprising a crosslinkable or crosslinked rubber composition prepared according to the process of claim 12.

21. A tire tread according to claim 20, constituted of said crosslinkable or crosslinked rubber composition.

22. A tire, comprising a tire tread according to claim 20.

* * * * *